United States Patent
Shinoda et al.

(10) Patent No.: US 10,924,041 B2
(45) Date of Patent: Feb. 16, 2021

(54) MOTOR DRIVE SYSTEM INCLUDING POWER STORAGE DEVICE

(71) Applicant: FANUC CORPORATION, Yamanashi (JP)

(72) Inventors: Shougo Shinoda, Yamanashi (JP); Satoshi Ikai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 36 days.

(21) Appl. No.: 16/181,511

(22) Filed: Nov. 6, 2018

(65) Prior Publication Data

US 2019/0149073 A1 May 16, 2019

(30) Foreign Application Priority Data

Nov. 10, 2017 (JP) .............................. JP2017-217523

(51) Int. Cl.
*H02P 7/292* (2016.01)
*H02M 7/00* (2006.01)
*H02M 3/06* (2006.01)
*H02P 7/28* (2016.01)
*H02M 7/797* (2006.01)
*H02M 7/162* (2006.01)
(Continued)

(52) U.S. Cl.
CPC .............. *H02P 7/292* (2013.01); *H02M 3/06* (2013.01); *H02M 7/003* (2013.01); *H02M 7/797* (2013.01); *H02P 7/2805* (2013.01); *H02M 5/4585* (2013.01); *H02M 7/162* (2013.01); *H02M 7/219* (2013.01); *H02M 2001/0083* (2013.01); *H02M 2001/0096* (2013.01); *H02P 2201/03* (2013.01)

(58) Field of Classification Search
CPC ...... H02P 7/292; H02P 7/2805; H02M 7/003; H02M 7/162; H02M 3/06
See application file for complete search history.

(56) References Cited

U.S. PATENT DOCUMENTS 8,854,004 B2 10/2014 Lee
8,901,866 B2 12/2014 Sakai et al.
(Continued)

FOREIGN PATENT DOCUMENTS

CN 102843095 A 12/2012
CN 102868358 A 1/2013
(Continued)

*Primary Examiner* — Jorge L Carrasquillo
*Assistant Examiner* — Bradley R Brown
(74) *Attorney, Agent, or Firm* — RatnerPrestia

(57) ABSTRACT

A motor drive system includes a converter configured to convert power between AC power in a power source and DC power in a DC link, an inverter for drive configured to convert power between the DC power and AC power in a servomotor for drive, a motor control unit for drive configured to control the servomotor for drive, a power storage device configured to store the DC power from the DC link or supplies the DC power to the DC link, and a determination unit configured to determine whether the holding energy of the power storage device is lower than a threshold for energy shortage determination, wherein when the holding energy is lower than the threshold for energy shortage determination, the motor control unit for drive controls the servomotor for drive by setting an additional standby period in which the servomotor for drive is inactive in a predetermined operation pattern.

14 Claims, 12 Drawing Sheets

(51) Int. Cl.
  *H02M 7/219*     (2006.01)
  *H02M 1/00*      (2006.01)
  *H02M 5/458*     (2006.01)

(56) References Cited

U.S. PATENT DOCUMENTS

| | | |
|---|---|---|
| 9,118,270 B2 | 8/2015 | Niwa et al. |
| 10,133,249 B2 | 11/2018 | Ikai et al. |
| 2010/0192788 A1* | 8/2010 | Tanaka ............... H02M 7/797 100/214 |
| 2012/0176088 A1* | 7/2012 | Lee .................... H02J 3/383 320/128 |
| 2013/0009576 A1 | 1/2013 | Iwashita et al. |
| 2014/0012426 A1* | 1/2014 | Funakubo ............ H02J 3/32 700/286 |

FOREIGN PATENT DOCUMENTS

| | | |
|---|---|---|
| CN | 103973193 A | 8/2014 |
| CN | 106982012 A | 7/2017 |
| EP | 2193969 A1 | 6/2010 |
| JP | 2011199996 A | 10/2011 |
| JP | 2012147661 A | 8/2012 |
| JP | 2013-009524 A | 1/2013 |
| JP | 2016-046833 A | 4/2016 |

\* cited by examiner

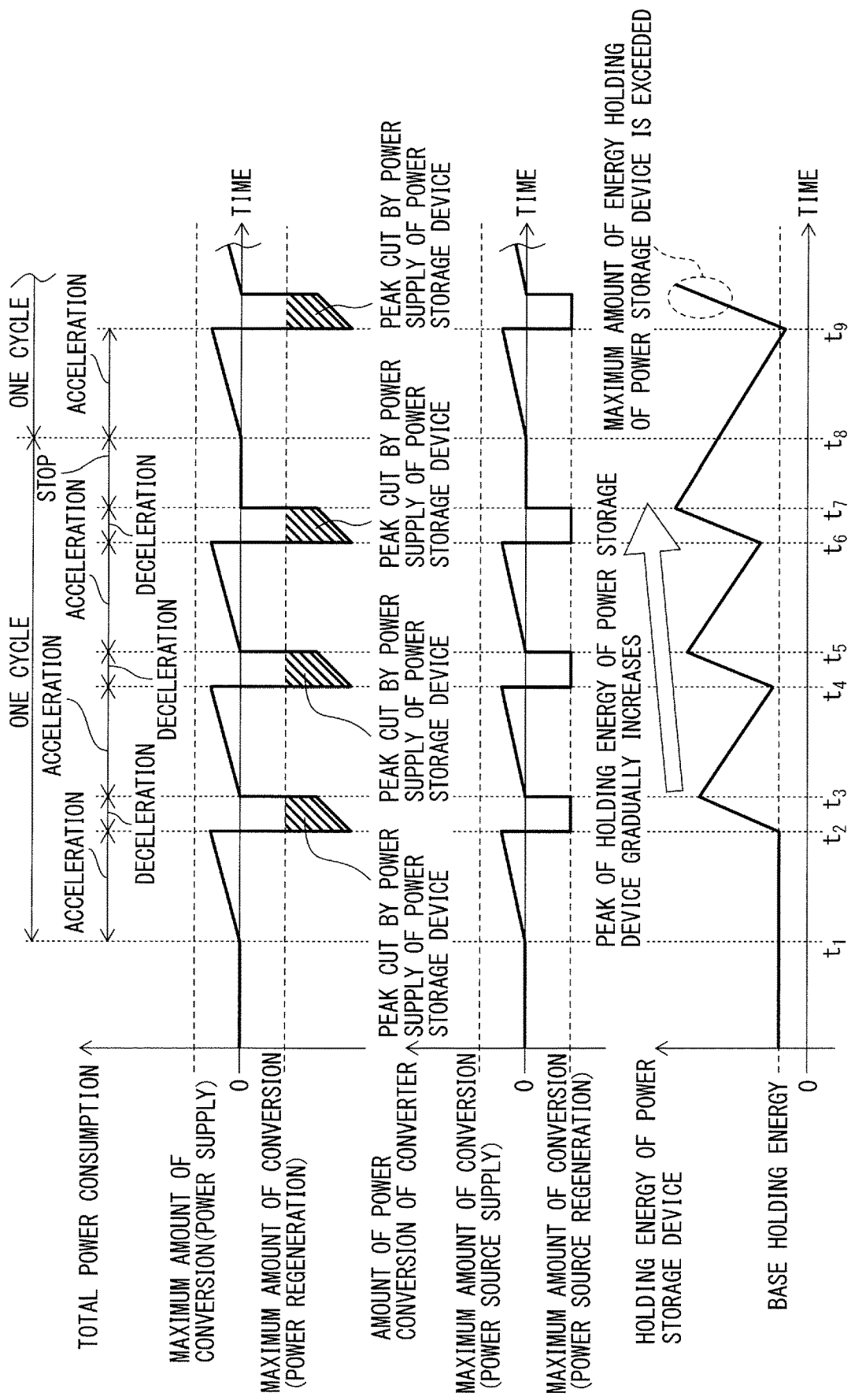

MOTOR DRIVE SYSTEM INCLUDING POWER STORAGE DEVICE

CROSS-REFERENCE TO RELATED APPLICATION

This application is a new U.S. Patent Application that claims benefit of Japanese Patent Application No. 2017-217523, filed Nov. 10, 2017 for all purposes.

BACKGROUND OF THE INVENTION

1. Field of the Invention

The present invention relates to a motor drive system including a power storage device.

2. Description of the Related Art

In a motor drive system for driving a servomotor provided to machines including a machine tool, a robot, etc. (hereinafter referred to as "servomotor for drive"), AC power supplied from an AC power source is converted into DC power by a converter (rectifier), the DC power is output to a DC link, the DC power in the DC link is further converted into AC power by an inverter, and the AC power is used as power for driving the servomotor for drive provided for each drive axis. It is a common practice to provide one converter for a plurality of inverters to reduce the cost and the footprint of the motor drive system. In other words, a converter configured to convert AC power supplied from an AC power source into DC power is used as a power source unit common to a plurality of "inverters for drive" (servo-amplifiers for drive), and these "inverters for drive" generate AC power for driving each servomotor for drive, using DC power output from the power source unit.

In acceleration or deceleration control of the servomotor for drive by the motor drive system, a power peak occurs because the AC power source is requested to output or regenerate high AC power. Especially in a motor drive system including a plurality of "inverters for drive", which are connected to one converter, the occurring power peak may be relatively high. Reducing the power peak because the higher the power peak is desirable, since the higher the power source capacity and the operational cost of the motor drive system, and the more power problems such as power failure and flickering are likely to occur in the power source.

To reduce the power peak, in one conventionally used method, a power storage device which can store DC power in a DC link connecting the converter to the "inverters for drive" in the motor drive system is provided, and energy consumed or regenerated by the servomotor for drive is exchanged as appropriate via the DC link. With this method, the power peak can be reduced because regenerative power generated from the servomotor for drive can be stored in the power storage device during deceleration of the servomotor for drive, or the stored power can be reused during acceleration of the servomotor for drive. In other words, the use of a power storage device which inputs and outputs power to and from the DC link allows coping with even an operation (acceleration and deceleration) of the servomotor for drive which involves a power consumption higher than the maximum output power of the power source unit.

As an example, a press machine causes a very high maximum power consumption upon a press operation and often poses a problem related to shortage of power source capacity. Under the circumstances, a motor drive system in a press machine includes a power storage device provided in a DC link and supplies power from the power storage device when the press machine consumes high power to allow driving of the press machine under a low-capacity power source. An example of the power storage device is a power storage device using a flywheel. For example, when the servomotor for drive consumes low power, a servomotor for buffer coupled to a flywheel is rotated at a constant speed, and when the servomotor for drive consumes higher power due to, e.g., its acceleration or deceleration, the rotational speed of the servomotor for buffer is lowered, power regeneration is performed via an inverter for buffer, and DC power for driving the servomotor for drive is supplied to the DC link. Hence, even for an acceleration and deceleration operation which consumes a power higher than a maximum amount of power conversion that is a maximum amount of power which can be converted by the converter, driving can be performed using regenerative power from a servomotor for buffer coupled to a flywheel having rotation energy.

As disclosed in, e.g., Japanese Unexamined Patent Publication (Kokai) No. 2013-009524, a motor drive device is known to include an AC/DC converter which converts AC power from an AC power source into DC power, a DC/AC converter which converts DC power into AC power for driving a motor or converts AC power regenerated from the motor into DC power, a DC link unit which connects a DC side of the AC/DC converter to a DC side of the DC/AC converter and exchanges DC power, an energy storage unit, including at least one capacitor storage unit and at least one flywheel storage unit, which is connected to the DC link unit and stores the DC power from the DC link unit or supplies the DC power to the DC link unit, a motor control unit which performs control to allow the DC/AC converter to output a desired AC power, based on a motor operation command for issuing a command related to an operation of the motor, and an energy control unit which performs control to allow the energy storage unit to store the DC power from the DC link unit or supply the DC power to the DC link unit.

As disclosed in, e.g., Japanese Unexamined Patent Publication (Kokai) No. 2016-046833, a system for controlling a servomotor for driving an axis of industrial machinery or a machine tool is known to include a plurality of first servomotors for driving axes, a plurality of converters which convert an AC voltage into a DC voltage, a plurality of first inverters which receive the DC voltage from the converters and convert the DC voltage into an AC voltage for driving the plurality of first servomotors or convert AC power regenerated from the first servomotors into DC power, second servomotors which rotate inertia, a plurality of second inverters which receive the DC voltage from the converters and convert the DC voltage into an AC voltage for driving the second servomotors or convert AC power regenerated from the second servomotors into DC power, and a servomotor controller which controls the plurality of first servomotors and the second servomotors, wherein the second servomotors are fewer in number than the plurality of second inverters, at least one of the second servomotors includes a plurality of independent windings, and at least some of the plurality of second inverters are connected to a plurality of independent windings provided in one second servomotor.

SUMMARY OF INVENTION

In a motor drive system limited in power supply from an AC power source to reduce the power peak, when DC power stored in a power storage device runs short due to any factor, AC power involved in driving a servomotor for drive may not be generated, so a motor control system and a machine tool including the same may accidentally make an alarm stop. For example, the servomotor for drive consumes power more than normal as an unexpected high load is applied to the servomotor for drive being driven. In such a case, since DC power stored in the power storage device is consumed more than originally planned, it is highly probable that the servomotor for drive may not subsequently continue to be driven due to power shortage. Therefore, in a motor drive system including a power storage device provided to reduce the power peak of an AC power source, a demand has arisen for a technique for improving the machine operating ratio by suppressing an alarm stop of the motor drive system due to shortage of DC power stored in the power storage device.

According to one aspect of the present disclosure, a motor drive system includes a converter configured to convert power between AC power in a power source and DC power in a DC link, an inverter for drive configured to convert power between the DC power in the DC link and the AC power serving as one of drive power and regenerative power for a servomotor for drive, a motor control unit for drive configured to control the servomotor for drive connected to the inverter for drive to operate the servomotor for drive in accordance with a predetermined operation pattern, a power storage device configured to store the DC power from the DC link or supplies the DC power to the DC link, and a determination unit configured to determine whether a holding energy of the power storage device is lower than a threshold for energy shortage determination defined in advance, wherein when the determination unit determines that the holding energy is lower than the threshold for energy shortage determination, the motor control unit for drive controls the servomotor for drive by setting an additional standby period in which the servomotor for drive is inactive at a certain point of time in the predetermined operation pattern.

BRIEF DESCRIPTION OF THE DRAWINGS

The present invention will be more clearly understood with reference to the following accompanying drawings:

FIG. 12 is a timing chart illustrating an exemplary relationship among the total power consumption, the amount of power conversion of the converter, and the holding energy of the power storage device, when excess holding energy is stored in the power storage device within one cycle in the conventional motor drive system.

DETAILED DESCRIPTION

Figure 1:
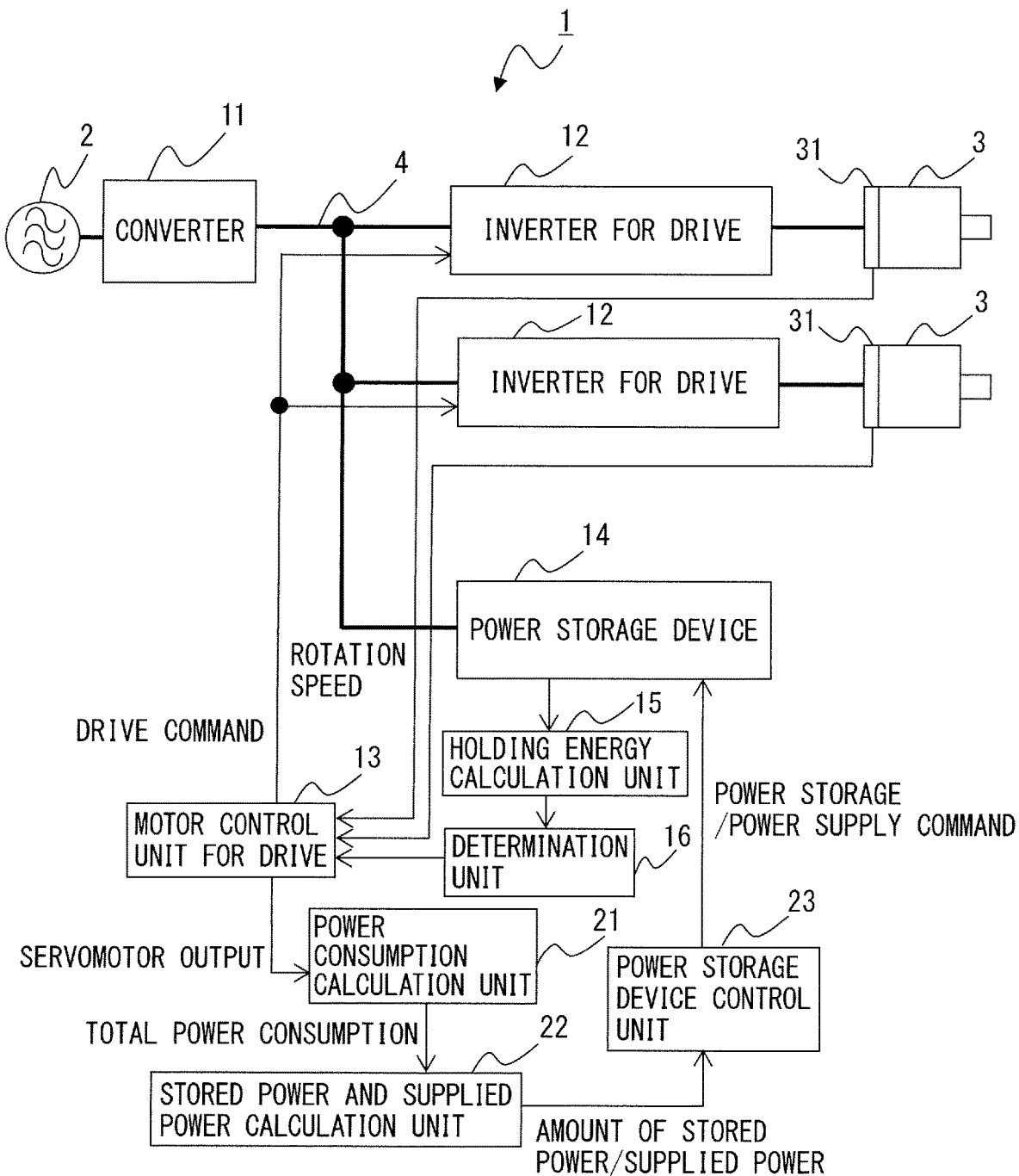
FIG. 1 is a block diagram illustrating a motor drive system according to one embodiment.

A motor drive system including a power storage device will be described below with reference to the drawings. The same reference numerals denote the same members throughout these drawings. The same reference numerals in different drawings denote components having the same functions. These drawings use different scales as appropriate to facilitate an understanding. The mode illustrated in each drawing is one example for carrying out the present invention, and the present invention is not limited to the modes illustrated in these drawings. The "output of a servomotor for drive" includes the "power consumption of the servomotor for drive" and the "amount of regenerative power of the servomotor for drive," and the "output of a servomotor for buffer" includes the "power consumption of the servomotor for buffer" and the "amount of regenerative power of the servomotor for buffer." The rotation angular speeds of the servomotor for drive and the servomotor for buffer will be simply referred to as the "speeds" or the "rotation speeds" hereinafter.

A motor drive system according to an embodiment of the present disclosure is used for a system including servomotors for drive for driving drive axes in machines including a machine tool, a robot, etc., "inverters for drive" which supply AC power for driving the servomotors for drive in correspondence with the servomotors for drive, and a converter. Embodiments of the present disclosure will be enumerated below.

FIG. 1 is a block diagram illustrating a motor drive system according to one embodiment. The case where two servomotors for drive 3 are controlled by a motor drive system 1 connected to a power source 2 will be taken as an example herein. However, the number of servomotors for drive 3 does not particularly limit this embodiment and may be one, or three or more. The numbers of phases of the power source 2 and the servomotors for drive 3 do not particularly limit this embodiment, either, and a three- or single-phase configuration, for example, may be used. The type of servomotor for drive 3 does not particularly limit this embodiment, either, and an induction or synchronous motor, for example, may be used. Machines equipped with the servomotors for drive 3 include, e.g., a machine tool, a robot, forging machinery, an injection molding machine, industrial machinery, various electrical appliances, an electric train, an automobile, and aircraft.

Each circuit component of the motor drive system 1 will be described first.

As illustrated in FIG. 1, the motor drive system 1 according to the embodiment includes a converter 11, "inverters for drive" 12, a motor control unit for drive 13, a power storage device 14, a holding energy calculation unit 15, and a determination unit 16. The motor drive system 1 further includes a power consumption calculation unit 21, a stored power and supplied power calculation unit 22, and a power storage device control unit 23.

The converter 11 serves as a rectifier configured to convert power between AC power in the power source 2 and DC power in a DC link 4. The converter 11 is implemented in a three-phase bridge circuit when a three-phase alternating current is supplied from the power source 2, and in a single-phase bridge circuit when a single-phase alternating current is supplied from the power source 2. The converter 11 is implemented as a bidirectional AC/DC-convertible power converter, such as a 120-degree conduction rectifier circuit and a PWM switching control rectifier circuit, which converts AC power input from the power source 2 into DC power and outputs the DC power to the DC side, and converts the DC power of the DC link 4 into AC power and outputs the AC power to the power source 2 during power regeneration. When the converter 11 is implemented as, e.g., a PWM switching control rectifier circuit, it is implemented in a bridge circuit of switching elements and diodes connected in antiparallel with the switching elements and performs bidirectional AC/DC power conversion by ON/OFF control of each switching element in accordance with a drive command received from a host controller (not illustrated). Examples of the switching element may include a unipolar transistor such as an FET, a bipolar transistor, an IGBT, a thyristor, and a GTO, but the type of switching element itself does not limit this embodiment, and other types of switching elements may be used.

For the converter 11, a "maximum amount of power conversion" is defined as a maximum amount of power which allows power conversion from AC power into DC power and a maximum amount of power which allows power conversion from DC power into AC power. The maximum amount of power conversion is generally defined as specification data associated with the conversion capacity of the converter 11 and is specified in, e.g., a specification table or an instruction manual of the converter 11.

The "inverters for drive" 12 are connected to the converter 11 via the DC link 4. The DC link 4 includes a DC link capacitor (also called a smoothing capacitor), although not illustrated herein. The DC link capacitor has the functions of storing DC power in the DC link 4 and of suppressing pulsation of the DC output of the converter 11.

The inverter for drive 12 constitutes a servo-amplifier configured to convert the DC power in the DC link 4 into AC power and supplies the AC power to the servomotor for drive 3 as drive power, to drive the servomotor for drive 3. The inverter for drive 12 converts power between the DC power in the DC link 4 and the AC power serving as drive power or regenerative power for the servomotor for drive 3. The servomotor for drive 3 generally includes at least one winding, and one inverter for drive 12 may be preferably used per winding in the servomotor for drive 3, to drive the servomotor for drive 3. FIG. 1 represents servomotors for drive 3 of the single-winding type as an example, and accordingly, one inverter for drive 12 is connected to each servomotor for drive 3.

The inverter for drive 12 is implemented in a bridge circuit of switching elements and diodes connected in antiparallel with the switching elements, and ON/OFF control of each switching element is performed based on PWM switching control of, e.g., the triangular wave comparison scheme. The inverter for drive 12 is implemented in a three-phase bridge circuit when the servomotor for drive 3 serves as a three-phase motor and in a single-phase bridge circuit when the servomotor for drive 3 serves as a single-phase motor. Examples of the switching element may include a unipolar transistor such as an FET, a bipolar transistor, an IGBT, a thyristor, and a GTO, but the type of switching element itself does not limit this embodiment, and other types of switching elements may be used.

The inverter for drive 12 converts power between the DC power of the DC link 4 and the AC power serving as drive power or regenerative power for the servomotor for drive 3 by ON/OFF control of each switching element based on a drive command received from the motor control unit for drive 13 (to be described later). More specifically, the inverter for drive 12 performs the switching operation of the internal switching elements, based on a drive command received from the motor control unit for drive 13, to convert DC power supplied from the converter 11 via the DC link 4 into AC power having a desired voltage and a desired frequency for driving the servomotor for drive 3 (inversion operation). The servomotor for drive 3 thus operates based on, e.g., variable-voltage, variable-frequency AC power. Regenerative power may occur during deceleration of the servomotor for drive 3, but the switching operation of the internal switching elements is performed based on a drive command received from the motor control unit for drive 13, to convert the AC regenerative power occurring in the servomotor for drive 3 into DC power and return the DC power to the DC link 4 (rectification operation).

The motor control unit for drive 13 controls the servomotors for drive 3 connected to the "inverters for drive" 12 to operate (i.e., rotate) them in accordance with a predetermined operation pattern. The operation pattern of the servomotors for drive 3 is formed by combining acceleration, deceleration, constant-speed rotation, and a stop as appropriate in accordance with the operation details of the machine equipped with the servomotors for drive 3. In this embodiment, a group of operations having the same details of the servomotors for drive 3 is defined as "one cycle," and the above-mentioned "operation pattern" is established by repeatedly executing this cycle. The operation pattern of the servomotors for drive 3 is defined by an operation program for the servomotors for drive 3. When, for example, the servomotors for drive 3 are provided in a machine tool, an operation program for the servomotors for drive 3 is defined as one of machining programs for the machine tool.

Since the servomotors for drive 3 are controlled in speed, torque, or rotor position, based on, e.g., variable-voltage, variable-frequency AC power supplied from an inverter for drive, control of the servomotors for drive 3 by the motor control unit for drive 13 is eventually implemented by controlling the power conversion operation of the "inverters for drive" 12. In other words, the motor control unit for drive 13 controls the servomotors for drive 3 to operate them in accordance with a predetermined operation pattern, by controlling power conversion of the "inverters for drive" 12. More specifically, the following operation is performed: The motor control unit for drive 13 generates a drive command for controlling the speeds, the torques, or the rotor positions of the servomotors for drive 3, based on, e.g., the (rotor) speeds (speed feedback) of the servomotors for drive 3 detected by a speed detector 51, a current flowing through the windings of the servomotors for drive 3 (current feedback), a predetermined torque command, and an operation program for the servomotors for drive 3. The power conversion operation by the "inverters for drive" 12 is controlled based on the drive command generated by the motor control unit for drive 13. The configuration of the motor control unit for drive 13 defined herein is merely illustrative, and the configuration of the motor control unit for drive 13 may be defined including terms such as a position command generation unit, a torque command generation unit, and a switching command generation unit.

In particular, when it is determined that the holding energy stored in the power storage device 14 is lower than a threshold for energy shortage determination defined in advance, the motor control unit for drive 13 according to the embodiment controls the servomotors for drive 3 by setting an additional standby period in which the servomotors for drive 3 are inactive at a certain point of time in a predetermined operation pattern. The additional standby period means the period in which the servomotors for drive 3 are additionally stopped, independently of a stop defined in advance in the normal operation pattern. The additional standby period will be described in detail later.

To allow driving of the servomotors for drive 3 at an output higher than the maximum amount of power conversion of the converter 11, the motor drive system 1 includes a power storage device 14. The power storage device 14 stores DC power from the DC link 4 (power storage) and supplies DC power to the DC link 4 (power supply). The power storage and power supply of the power storage device 14 are controlled by the power storage device control unit 23.

Figure 2:
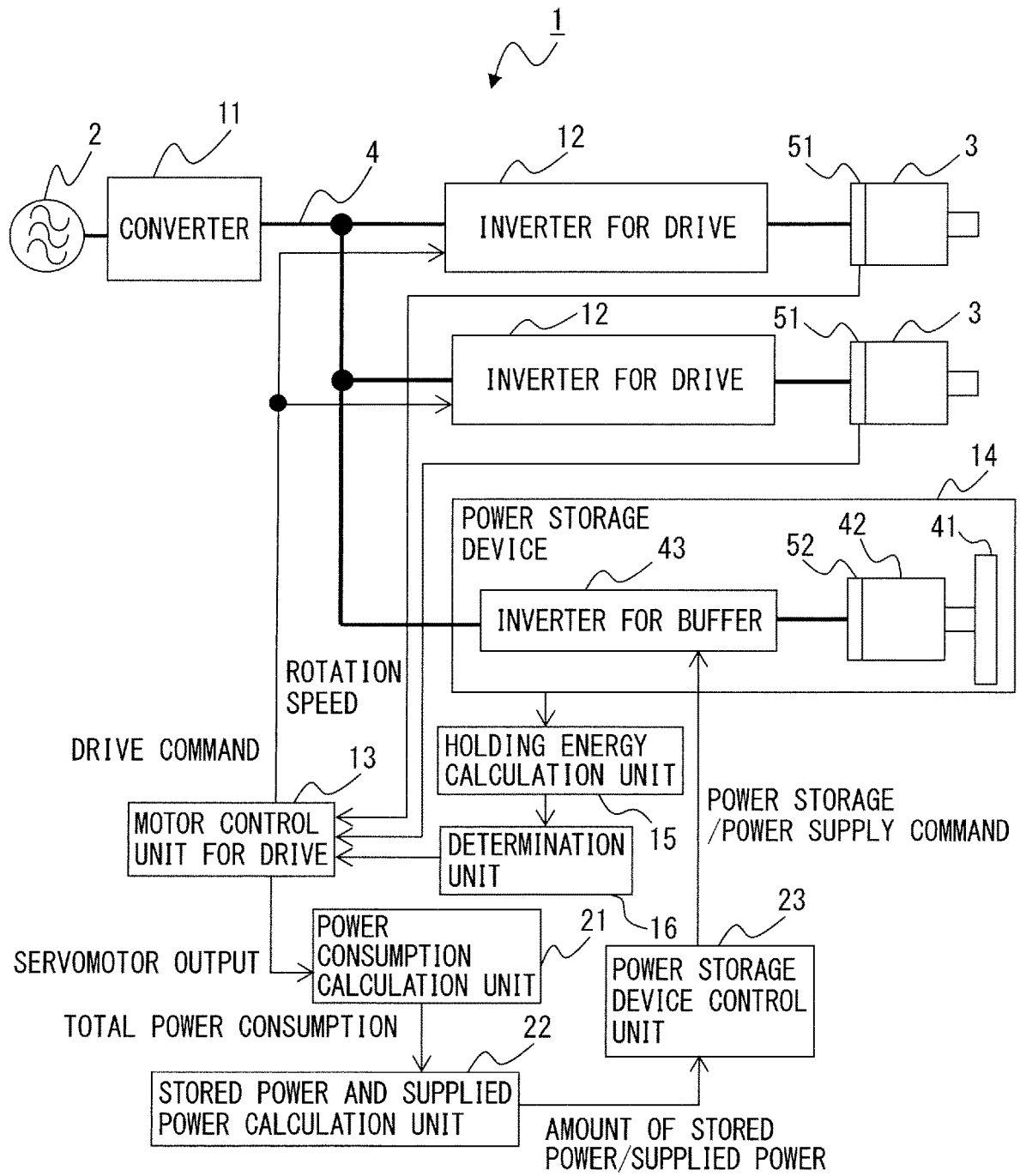
FIG. 2 is a block diagram illustrating the motor drive system according to the embodiment, which includes a flywheel power storage device.
Figure 3:
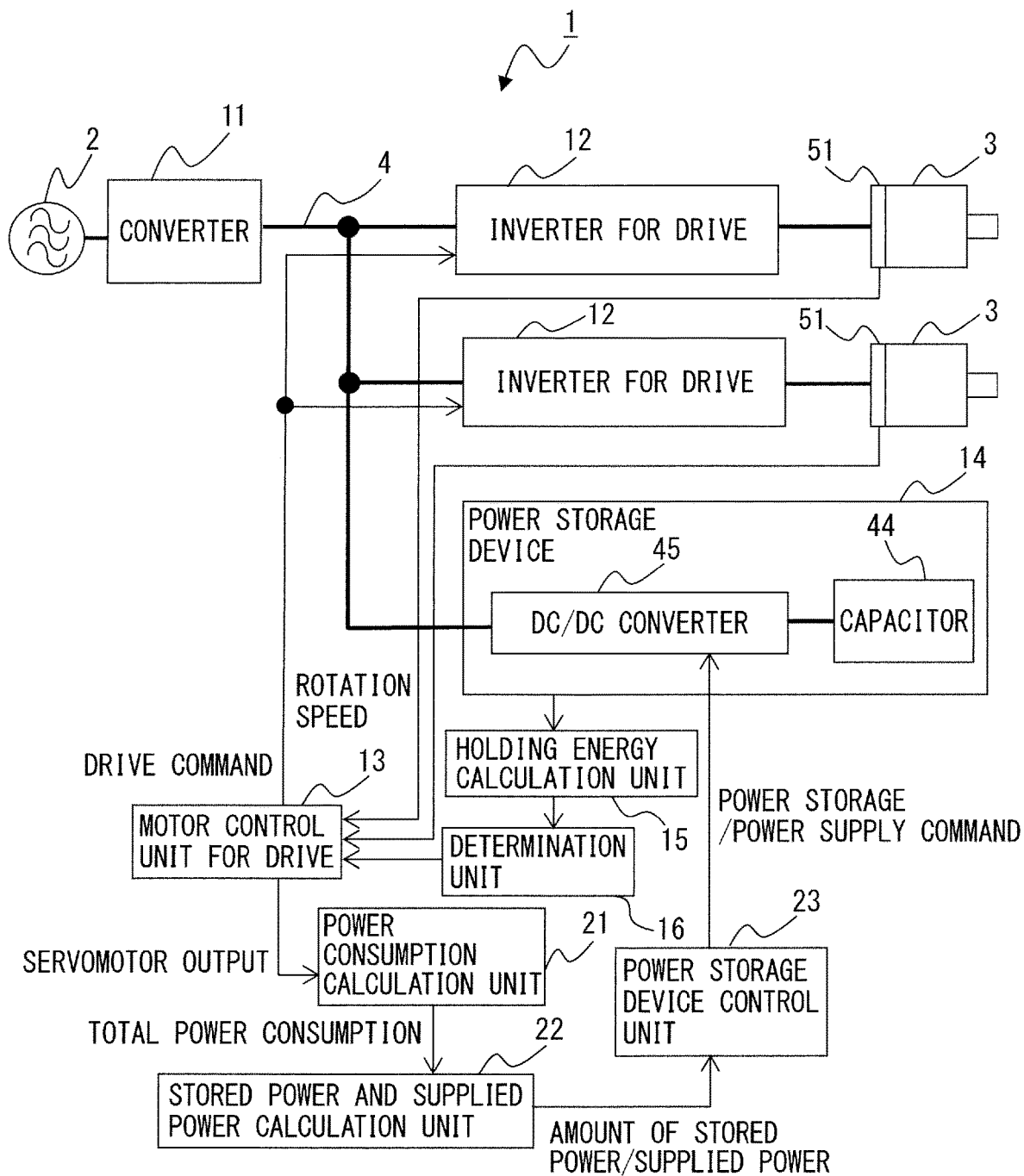
FIG. 3 is a block diagram illustrating the motor drive system according to the embodiment, which includes a capacitor power storage device.

Examples of the power storage device 14 include a flywheel power storage device as illustrated in FIG. 2 and a capacitor power storage device as illustrated in FIG. 3.

FIG. 2 is a block diagram illustrating the motor drive system according to the embodiment, which includes a flywheel power storage device. The flywheel power storage device 14 includes a flywheel 41, a servomotor for buffer 42, and an inverter for buffer 43.

The flywheel 41 can store rotation energy, which is also called inertia.

The servomotor for buffer 42 is used to rotate the flywheel 41, which is connected to the rotation shaft of the servomotor for buffer 42. Rotation energy can be stored in the flywheel 41 by rotating the servomotor for buffer 42. The number of phases of the servomotor for buffer 42 does not particularly limit this embodiment, and a three- or single-phase configuration, for example, may be used. A speed detector 52 is provided in the servomotor for buffer 42, and the (rotor) speed of the servomotor for buffer 42 detected by the speed detector 52 is used to control the power storage device 14 by the power storage device control unit 23.

The inverter for buffer 43 converts power between the DC power in the DC link 4 and the AC power serving as drive power or regenerative power for the servomotor for buffer 42 by ON/OFF control of each switching element based on power storage and power supply commands received from the power storage device control unit 23. The inverter for buffer 43 is implemented in a bridge circuit of switching elements and diodes connected in antiparallel with the switching elements. The inverter for buffer 43 is implemented in a three-phase bridge circuit when the servomotor for buffer 42 serves as a three-phase motor and in a single-phase bridge circuit when the servomotor for buffer 42 serves as a single-phase motor. Examples of the switching element may include a unipolar transistor such as an FET, a bipolar transistor, an IGBT, a thyristor, and a GTO, but the type of switching element itself does not limit this embodiment, and other types of switching elements may be used. For example, ON/OFF control of each switching element in the inverter for buffer 43 is performed based on a PWM switching signal obtained by comparing the received drive command with a triangular carrier.

By controlling power conversion of the inverter for buffer 43 by the power storage device control unit 23, the servomotor for buffer 42 connected to the flywheel 41 rotates with acceleration or deceleration or rotates at a constant speed, so that the amount of DC power to be stored or supplied by the power storage device 14 (the amount of DC power to be input to or output from the DC link 4 by the power storage device 14) is adjusted. More specifically, the following operation is performed.

In power storage of the power storage device 14, the inverter for buffer 43 performs an inversion operation for converting the DC power in the DC link 4 into AC power, based on a power storage command received from the power storage device control unit 23. Hence, electrical energy from the DC link 4 is fed to the servomotor for buffer 42 and acts to rotate the servomotor for buffer 42 connected to the flywheel 41. In this manner, in the flywheel power storage device 14, electrical energy flowing from the DC link 4 into the power storage device 14 is converted into rotation energy of the flywheel 41 and stored.

In power supply of the power storage device 14, the inverter for buffer 43 performs a rectification operation for converting AC regenerative power into DC power by generating the AC regenerative power upon decelerating the servomotor for buffer 42 connected to the flywheel 41, based on a power supply command received from the power storage device control unit 23. Hence, rotation energy stored in the flywheel 41 is converted into electrical energy and supplied to the DC link 4.

FIG. 3 is a block diagram illustrating the motor drive system according to the embodiment, which includes a capacitor power storage device. The capacitor power storage device 14 includes a capacitor 44 and a DC/DC converter 45 configured to convert power between the DC power in the DC link 4 and the DC power stored in the capacitor 44.

Examples of the DC/DC converter 45 include a DC/DC boost and buck chopper circuit. The amount of DC power to be stored or supplied by the power storage device 14 (the amount of DC power to be input to or output from the DC link 4 by the power storage device 14) is adjusted by controlling the boosting and bucking operations of the DC/DC converter 45 by the power storage device control unit 23. More specifically, the following operation is performed.

In power storage of the power storage device 14, the DC/DC converter 45 is controlled to set the DC voltage on the capacitor 44 lower than that on the DC link 4 by the power storage device control unit 23, based on a power storage command received from the power storage device control unit 23. Hence, electrical energy flows from the DC link 4 into the capacitor 44, and power storage of the power storage device 14 is performed.

In power supply of the power storage device 14, the DC/DC converter 45 is controlled to set the DC voltage on the capacitor 44 higher than that on the DC link 4 by the power storage device control unit 23, based on a power supply command received from the power storage device control unit 23. Hence, electrical energy flows from the capacitor 44 into the DC link 4, and power supply of the power storage device 14 is performed.

Figure 4:
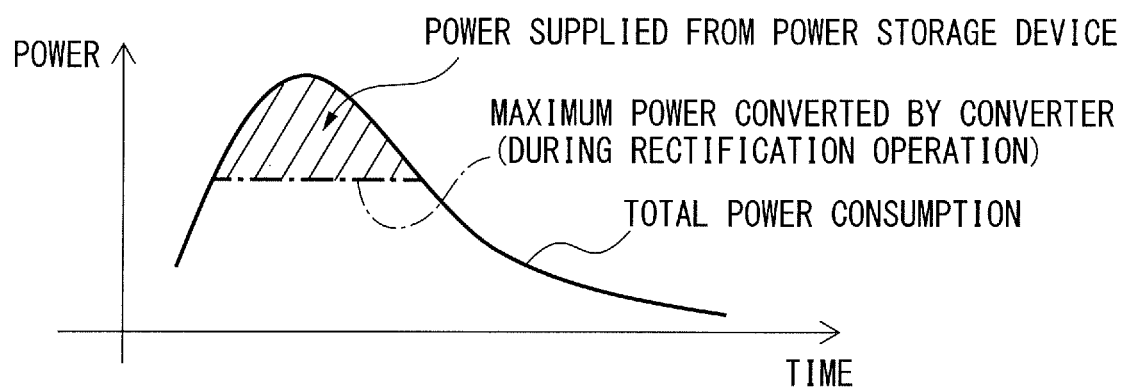
FIG. 4 is a graph illustrating an exemplary relationship between the DC power supplied from the power storage device in the motor drive system according to the embodiment and that supplied from a converter.

As the motor drive system 1 includes the power storage device 14 that performs the above-mentioned operations, energy stored in the power storage device 14 is supplied to the servomotors for drive 3, as well as energy supplied from the converter 11, and is used as power for accelerating the servomotors for drive 3, during acceleration of the servomotors for drive 3. FIG. 4 is a graph illustrating an exemplary relationship between the DC power supplied from the power storage device in the motor drive system according to the embodiment and that supplied from a converter. Power supplied from the converter 11 to the DC link 4 is consumed not only as drive power for the servomotors for drive 3 (i.e., the outputs of the servomotors for drive 3 correspond to the drive power) but also as winding losses in the servomotors for drive 3, a loss in the converter 11, and losses in the "inverters for drive" 12. The sum of the powers consumed by the servomotors for drive 3, the "inverters for drive" 12, and the converter 11 will be referred to as a "total power consumption" hereinafter and is indicated by a solid line in FIG. 4. An alternate long and short dashed line indicates the maximum amount of power conversion in the rectification operation of the converter 11. As illustrated in FIG. 4, the amount (a hatched area in FIG. 4) by which the maximum supplied power of the converter 11 is exceeded in the total power consumption is compensated for by DC power supplied from the power storage device 14 to the DC link 4.

In the motor drive system 1, during deceleration of the servomotors for drive 3, energy regenerated from the servomotors for drive 3 is stored in the power storage device 14. Since the energy stored in the power storage device 14 is used to drive the servomotors for drive 3, in conjunction with power supplied from the converter 11, the servomotors for drive 3 can be driven at an output higher than the maximum amount of power conversion of the converter 11, and the power peak can thus be reduced. Reducing the power peak can curb the power source capacity and the operational cost of the motor drive system 1 and can even prevent power failure and flickering in the power source 2.

The power storage device control unit 23 controls power storage and power supply of the power storage device 14 by controlling the power conversion operation of the inverter for buffer 43 in the power storage device 14, which is implemented as the flywheel power storage device 14 illustrated in FIG. 2, and controlling the boosting and bucking operations of the DC/DC converter 45 in the power storage device 14, which is implemented as the capacitor power storage device 14 illustrated in FIG. 3. Power storage and power supply of the power storage device 14 are controlled by the power storage device control unit 23, using the calculation results obtained by the power consumption calculation unit 21 and the stored power and supplied power calculation unit 22.

The power consumption calculation unit 21 calculates a total power consumption obtained as the sum of the outputs of the servomotors for drive 3, the winding losses in the servomotors for drive 3, the loss in the converter 11, and the losses in the "inverters for drive" 12. The output of the servomotor for drive 3 is obtained by multiplying the rotation speed of the servomotor for drive 3 detected by the speed detector 51 and the torque of the servomotor for drive 3. When the servomotor for drive 3 accelerates, it consumes AC power supplied from the inverter for drive 12, and the output of the servomotor for drive 3 upon this power consumption is defined to be "positive." This means that when power is regenerated upon deceleration of the servomotor for drive 3, the output of the servomotor for drive 3 is "negative." Normally, since the winding loss in the servomotor for drive 3, the loss in the converter 11, and the loss in the inverter for drive 12 are lower than the absolute value of the output of the servomotor for drive 3, the output of the servomotor for drive 3 has a dominant influence on the total power consumption. Accordingly, the positive or negative sign (consumption or regeneration) of the output of the servomotor for drive 3 nearly corresponds to that of the total power consumption.

Since the inverter for buffer 43 and the DC/DC converter 45 also have losses, the power consumption calculation unit 21 may calculate as a total power consumption, the sum of the loss in the inverter for buffer 43 or the DC/DC converter 45 further added to the sum of the outputs of the servomotors for drive 3, the winding losses in the servomotors for drive 3, the loss in the converter 11, and the losses in the "inverters for drive" 12.

The stored power and supplied power calculation unit 22 calculates an amount of DC power stored from the DC link 4 or supplied to the DC link 4 by the power storage device 14, based on the total power consumption calculated by the power consumption calculation unit 21 and the maximum amount of power conversion of the converter 11. More specifically, the stored power and supplied power calculation unit 22 calculates the difference between the maximum amount of power conversion of the converter 11 and the total power consumption calculated by the power consumption calculation unit 21 (i.e., the value obtained by subtracting the total power consumption from the maximum amount of power conversion). The difference between the maximum amount of power conversion of the converter 11 and the total power consumption calculated by the power consumption calculation unit 21 corresponds to the amount of DC power stored from the DC link 4 or supplied to the DC link 4 by the power storage device 14. When, for example, the difference between the maximum amount of power conversion and the total power consumption calculated by the power consumption calculation unit 21 for the rectification operation of the converter 11 is negative, since the total power consumption is greater than the maximum supplied power in rectification of the converter 11, i.e., energy fed from the power source 2 to the DC link 4 by the converter 11 is insufficient to cover the overall total power consumption, the power shortage may be preferably compensated for by DC power supplied from the power storage device 14 to the DC link 4. The stored power and supplied power calculation unit 22 sends information concerning the power shortage to the power storage device control unit 23 as an "amount of supplied power." Further, when, for example, the difference between the absolute value of the maximum amount of power conversion and that of the total power consumption calculated by the power consumption calculation unit 21 for the inversion operation of the converter 11 is negative, since the total power consumption is greater than the maximum regenerative power in inversion of the converter 11, the excess power may be preferably stored in the power storage device 14. The stored power and supplied power calculation unit 22 sends information concerning the excess power to the power storage device control unit 23 as an "amount of stored power."

The power storage device control unit 23, upon receiving the amount of supplied power from the stored power and supplied power calculation unit 22, outputs to the power storage device 14, a power supply command for performing control to supply DC power corresponding to this amount of supplied power to the DC link 4. The power storage device control unit 23, upon receiving the amount of stored power from the stored power and supplied power calculation unit 22, outputs to the power storage device 14, a power storage command for performing control to store DC power corresponding to this amount of stored power from the DC link 4. The power storage device 14 performs a power supply operation upon receiving a power supply command from the power storage device control unit 23 and performs a power storage operation upon receiving a power storage command from the power storage device control unit 23.

The holding energy of the power storage device 14 is calculated by the holding energy calculation unit 15 in the following way.

In the flywheel power storage device 14 illustrated in FIG. 2, since the output of the servomotor for buffer 42, for example, corresponds to the holding energy of the power storage device 14, the holding energy calculation unit 15 calculates the output of the servomotor for buffer 42 as the holding energy of the power storage device 14. The holding energy of the power storage device 14 that is the output of the servomotor for buffer 42 can be calculated based on the following equation:

$$\text{Holding Energy of Power Storage Device } 14 = (\tfrac{1}{2}) \times J \times \omega^2 \quad (1)$$

where ω is the rotation speed (angular speed) of the servomotor for buffer 42 detected by the speed detector 52, and J is the moment of inertia of the servomotor for buffer 42.

As is obvious from equation (1), since the holding energy of the power storage device 14 is proportional to the square of the rotation speed of the servomotor for buffer 42, the holding energy calculation unit 15 may be omitted and the rotation speed (or its square) of the servomotor for buffer 42 may be used as a parameter representing the holding energy of the power storage device 14.

In the capacitor power storage device 14 illustrated in FIG. 3, since the amount of DC power stored in the capacitor 44, for example, corresponds to the holding energy of the power storage device 14, the holding energy calculation unit 15 calculates the amount of DC power stored in the capacitor 44 as the holding energy of the power storage device 14. The holding energy of the power storage device 14 can be calculated based on the following equation:

$$\text{Holding Energy of Power Storage Device } 14 = (\tfrac{1}{2}) \times C \times V^2 \quad (2)$$

where C is the capacitance of the capacitor 44, and V is the voltage of the capacitor 44.

As is obvious from equation (2), since the holding energy of the power storage device 14 is proportional to the square of the voltage of the capacitor 44, the holding energy calculation unit 15 may be omitted and the voltage (or its square) of the capacitor 44 may be used as a parameter representing the holding energy of the power storage device 14.

The determination unit 16 determines whether the holding energy of the power storage device 14 is lower than a threshold for energy shortage determination defined in advance. The determination unit 16 further determines whether the holding energy of the power storage device 14 is higher than a first threshold for restoration determination defined in advance. In other words, the threshold for energy shortage determination is used by the determination unit 16 for determination processing as to whether an additional standby period for restoring the holding energy of the power storage device 14 is to be set. The first threshold for restoration determination is used by the determination unit 16 for determination processing as to whether the additional standby period set upon determination that the holding energy is lower than the threshold for energy shortage determination is to be ended. When the appropriate amount of holding energy of the power storage device 14 is defined as a "base holding energy," the base holding energy, the threshold for energy shortage determination, and the first threshold for restoration determination satisfy the following relation:

$$\text{Base Holding Energy} > \text{First Threshold for Restoration Determination} \geq \text{Threshold for Energy Shortage Determination} \quad (3)$$

As presented in relation (3), the first threshold for restoration determination is set to a value equal to or larger than the threshold for energy shortage determination.

When the holding energy of the power storage device 14 is calculated as an amount of power based on equation (1) or (2) by the holding energy calculation unit 15, a threshold for energy shortage determination and a first threshold for restoration determination having the same unit as that of the amount of power are set. When the holding energy calculation unit 15 is omitted and the holding energy of the power storage device 14 is represented by the rotation speed (or its square) of the servomotor for buffer 42, a threshold for energy shortage determination and a first threshold for restoration determination having the same unit as that of the rotation speed (or its square) are set. When the holding energy calculation unit 15 is omitted and the holding energy of the power storage device 14 is represented by the voltage (or its square) of the capacitor 44, a threshold for energy shortage determination and a first threshold for restoration determination having the same unit as that of the voltage (or its square) are set.

In the motor drive system 1 including the power storage device 14 provided to reduce the power peak of the power source 2, when the servomotors for drive 3 are driven, power is supplied from the power storage device 14 to the DC link 4 in an amount by which only energy fed from the power source 2 to the DC link 4 by the converter 11 is insufficient, so that the servomotors for drive 3 can continue to be driven. The holding energy of the power storage device 14 is replenished as appropriate with energy fed from the power source 2 by the converter 11 or the regenerative energy of the servomotors for drive 3 and does not run short as long as the servomotors for drive 3 operate in accordance with the normal operation pattern. However, when a deviation from the normal operation pattern occurs and an unexpected high load is applied to the servomotors for drive 3, since the servomotors for drive 3 consume power more than normal, the holding energy of the power storage device is consumed more than originally planned, and the servomotors for drive may not continue to be driven due to power shortage. Under the circumstances, in this embodiment, when the holding energy of the power storage device is lower than originally planned, an additional standby period is set as the period in which the servomotors for drive 3 are inactive, and during the additional standby period, the holding energy of the power storage device 14 is replenished with energy fed from the power source 2 by the converter 11.

When the determination unit 16 determines that the holding energy is lower than the threshold for energy shortage determination, the motor control unit for drive 13 controls the servomotors for drive 3 by setting an additional standby period in which the servomotors for drive 3 are inactive at a certain point of time in a predetermined operation pattern. In the normal operation pattern of the servomotors for drive 3, acceleration, deceleration, constant-speed rotation, and a stop are combined as appropriate and defined in advance in accordance with the operation details of the machine equipped with the servomotors for drive 3, and an additional standby period is additionally set as the state in which the servomotors for drive 3 are inactive (i.e., the stopped state), independently of the stopped state in the normal operation pattern. In other words, when the determination unit 16 determines that the holding energy is lower than the threshold for energy shortage determination, the motor control unit for drive 13 controls the servomotors for drive to start an operation, defined as a predetermined operation pattern in advance, after the elapse of an additional standby period from the start timing of the operation. During the additional standby period, since the servomotors for drive 3 are kept standby without operation and therefore consume no power, and the power storage device 14 can store DC power fed from the power source 2 to the DC link 4 by the converter 11, the holding energy of the power storage device 14 gradually rises during the additional standby period.

During the additional standby period, the determination unit 16 determines whether the holding energy of the power storage device 14 is higher than the first threshold for restoration determination. The holding energy of the power storage device 14 gradually rises during the additional standby period, and when the determination unit 16 determines that the holding energy of the power storage device 14 is higher than the first threshold for restoration determination, it ends the additional standby period, and the motor control unit for drive 13 controls the servomotors for drive 3 in accordance with the normal operation pattern. In other words, an end point for the additional standby period set upon determination by the determination unit 16 that the holding energy is lower than the threshold for energy shortage determination is set after the determination unit 16 further determines that the holding energy is higher than the first threshold for restoration determination after determining that the holding energy is lower than the threshold for energy shortage determination. This means that the additional standby period continues until the determination unit 16 determines that the holding energy is higher than the first threshold for restoration determination after determining that the holding energy is lower than the threshold for energy shortage determination.

A start point for the additional standby period is set, e.g., in the following way to minimize the adverse effect that an additional stop of the servomotors for drive 3 exerts on the machine equipped with the servomotors for drive 3. "One cycle" defines a group of operations having the same details of the servomotors for drive 3, and an "operation pattern" for the servomotors for drive 3 is established by repeatedly executing this cycle, as described earlier.

A start point for the additional standby period according to the first mode is set between one certain cycle and another cycle subsequent to the certain cycle in a predetermined operation pattern in which an operation for each cycle is defined. In other words, according to the first mode, when the determination unit 16 determines that the holding energy is lower than the threshold for energy shortage determination, the motor control unit for drive 13 starts an additional standby period after the completion of one certain cycle and before the start of another cycle subsequent to the certain cycle in a predetermined operation pattern in which an operation for each cycle is defined.

A start point for the additional standby period according to the second mode is set at a certain point of time within one certain cycle in a predetermined operation pattern in which an operation for each cycle is defined. According to the second mode, an additional standby period is set in one cycle, and a start point for the additional standby period is set during a stop defined in this cycle in advance, to minimize the adverse effect that an additional stop of the servomotors for drive 3 exerts on the machine equipped with the servomotors for drive 3. In other words, according to the second mode, when the determination unit 16 determines that the holding energy is lower than the threshold for energy shortage determination, the motor control unit for drive 13 delays the timing of the start of an operation (e.g., acceleration, deceleration, or constant-speed rotation) subsequent to a stop in one cycle by setting the period of the stop longer by the additional standby period than defined in advance.

A start point for the additional standby period may be set in accordance with the first mode alone, the second mode alone, or both the first and second modes.

The execution timing of determination processing as to whether an additional standby period is to be set using the threshold for energy shortage determination by the determination unit 16 is set, e.g., in the following way.

The execution timing of determination processing by the determination unit 16 according to the first mode is set between one certain cycle and another cycle subsequent to the certain cycle in a predetermined operation pattern in which an operation for each cycle is defined. The execution timing of determination processing by the determination unit 16 may be set each time after the completion of one cycle or set for each set of several cycles. In this manner, according to the first mode, the determination unit 16 determines whether the holding energy is lower than the threshold for energy shortage determination, after the completion of one certain cycle and before the start of another cycle subsequent to the certain cycle, in a predetermined operation pattern in which an operation for each cycle is defined.

The execution timing of determination processing by the determination unit 16 according to the second mode is set at a certain point of time within one certain cycle in a predetermined operation pattern in which an operation for each cycle is defined. The execution timing of determination processing by the determination unit 16 does not adversely affect the machine equipped with the servomotors for drive 3, regardless of the point of time at which this timing is set in one cycle, unlike the start point of the additional standby period. In this manner, according to the second mode, the determination unit 16 determines whether the holding energy is lower than the threshold for energy shortage determination, at a certain point of time within one certain cycle, in a predetermined operation pattern in which an operation for each cycle is defined.

The start points of the additional standby period according to the above-mentioned first and second modes, and the execution timings of determination processing as to whether an additional standby period is to be set using the threshold for energy shortage determination by the determination unit 16 according to the first and second modes are implemented in combination as appropriate. For example, the start point of the additional standby period according to the first mode and the execution timing of determination processing by the determination unit 16 according to the first mode can be implemented in combination, or the start point of the additional standby period according to the second mode and the execution timing of determination processing by the determination unit 16 according to the second mode can be implemented in combination. In this case, since the start point of the additional standby period is set immediately after the determination unit 16 determines that the holding energy is lower than the threshold for energy shortage determination, shortage of DC power stored in the power storage device 14 can be more reliably prevented. Alternatively, for example, the start point of the additional standby period according to the first mode and the execution timings of determination processing by the determination unit 16 according to the first and second modes can be implemented in combination, or the start point of the additional standby period according to the second mode and the execution timings of determination processing by the determination unit 16 according to the first and second modes can be implemented in combination. In this case, since the determination unit 16 more frequently performs determination processing, shortage of DC power stored in the power storage device 14 can be more reliably prevented. Or again, for example, when the start points of the additional standby period according to the first and second modes and the execution timings of determination processing by the determination unit 16 according to the first and second modes are implemented in combination, since the determination unit 16 more frequently performs determination processing and additional standby periods are set more times, less holding energy of the power storage device 14 is to be restored in the additional standby period, so that the lengths of individual additional standby periods can be set smaller.

Determination processing as to whether the additional standby period is to be ended using the first threshold for restoration determination is always performed by the determination unit 16 during the additional standby period.

As described above, with the motor drive system 1 according to the embodiment, when the determination unit 16 determines that the holding energy is lower than the threshold for energy shortage determination, the motor control unit for drive 13 controls the servomotors for drive 3 by setting an additional standby period in which the servomotors for drive 3 are inactive at a certain point of time in a predetermined operation pattern. During the additional standby period, since the servomotors for drive 3 are kept standby without operation and therefore consume no power, and the power storage device 14 can store DC power fed from the power source 2 to the DC link 4 by the converter 11, the holding energy of the power storage device 14 gradually rises. When the holding energy of the power storage device 14 gradually rises and is restored to be higher than the first threshold for restoration determination, the motor control unit for drive 13 ends the additional standby period and controls the servomotors for drive 3 in accordance with the normal operation pattern. In this manner, when the determination unit 16 determines that the holding energy is lower than the threshold for energy shortage determination, since the servomotors for drive 3 are controlled by setting an additional standby period in which the servomotors for drive 3 are inactive at a certain point of time in a predetermined operation pattern, the machine operating ratio can be improved by preventing an alarm stop of the motor drive system due to shortage of DC power stored in the power storage device 14.

The overall processing time is longer when an additional standby period is set in the operation pattern than when no additional standby period is set. Therefore, when an additional standby period is set as the holding energy is lower than the threshold for energy shortage determination, a notification unit (not illustrated) which sends a notification of setting of an additional standby period may be provided. The notification unit may be implemented as a display for, e.g., a personal computer, a portable terminal, or a touch panel. When, for example, the motor drive system 1 is used to control driving of the servomotors for drive 3 provided in a machine tool, an accessory display attached to a numerical controller for the machine tool may be used as the notification unit. Alternatively, for example, the notification unit may be implemented as an acoustic device which emits a sound such as a voice, a loudspeaker, a buzzer, or a chime. Or again, for example, the notification unit may take the form of printing out and displaying on, e.g., a sheet surface using a printer. The notification unit may even be implemented by combining the above-mentioned examples together as appropriate. Data associated with, e.g., the time instant and the number of times used to set an additional standby period may even be stored in a memory device and used for another purpose.

Figure 5:
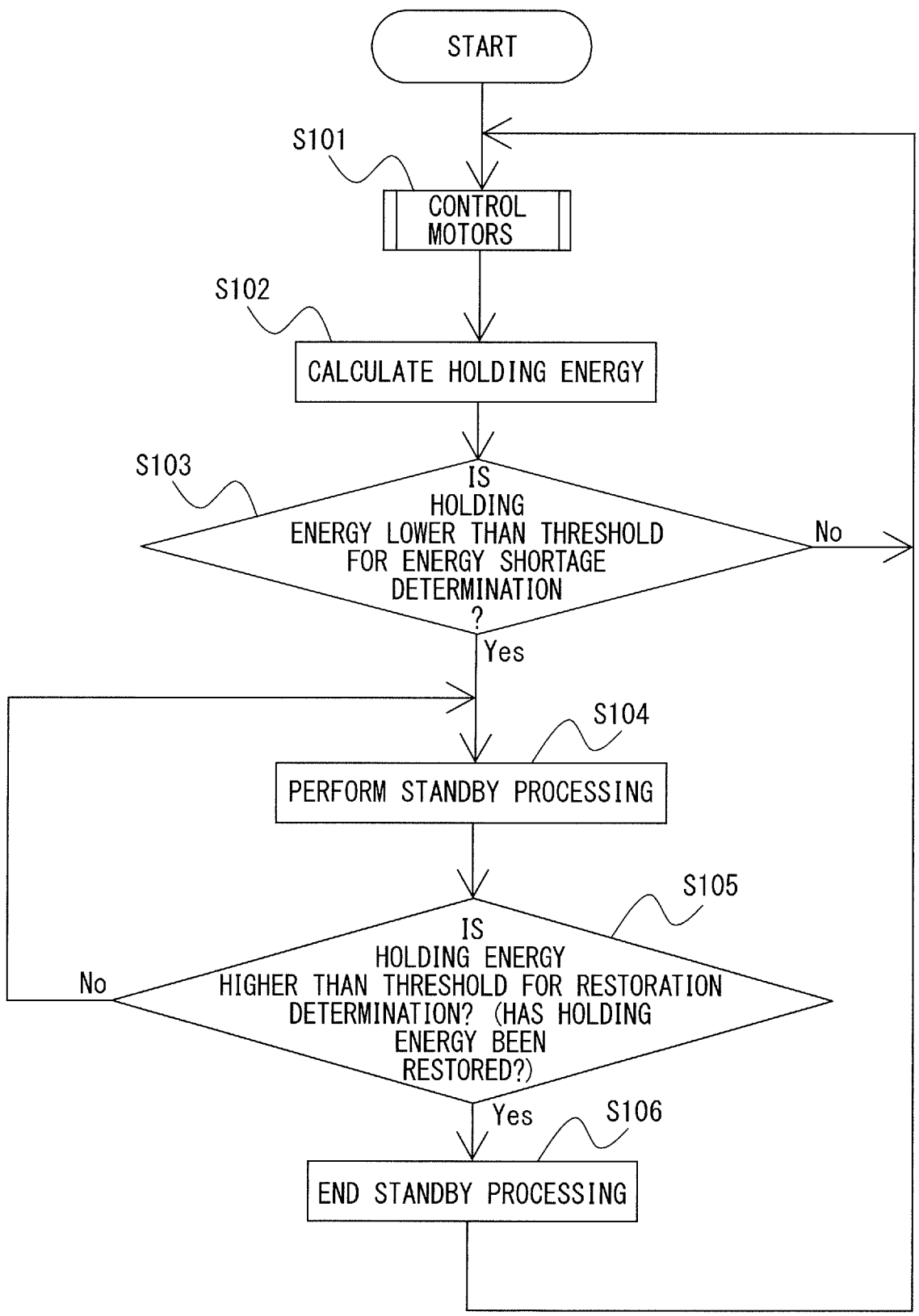
FIG. 5 is a flowchart illustrating the operation sequence of the motor drive system according to the embodiment.

The operation sequence of the motor drive system 1 will be described subsequently. FIG. 5 is a flowchart illustrating the operation sequence of the motor drive system according to the embodiment.

The motor control unit for drive 13 controls the servomotors for drive 3 to operate them in accordance with a predetermined operation pattern (step S101). During this control, the power storage device control unit 23 controls power storage and power supply of the power storage device 14, using the calculation results obtained by the power consumption calculation unit 21 and the stored power and supplied power calculation unit 22.

In step S102, the holding energy calculation unit 15 calculates the holding energy of the power storage device 14.

In step S103, the determination unit 16 determines whether the holding energy of the power storage device 14 is lower than a threshold for energy shortage determination defined in advance. When it is determined that the holding energy is not lower than the threshold for energy shortage determination, the process returns to step S101. When it is determined that the holding energy is lower than the threshold for energy shortage determination, the process advances to step S104.

In step S104, the motor control unit for drive 13 sets an additional standby period in which the servomotors for drive 3 are inactive at a certain point of time in the predetermined operation pattern (standby processing). During the additional standby period, since the servomotors for drive 3 are kept standby without operation and therefore consume no power, and the power storage device 14 stores DC power fed from the power source 2 to the DC link 4 by the converter 11, the holding energy of the power storage device 14 gradually rises.

In step S105, the determination unit 16 determines whether the holding energy is higher than a first threshold for restoration determination. The determination processing of step S105 is used to determine whether the holding energy of the power storage device 14 has been restored to be higher than the first threshold for restoration determination. When it is determined that the holding energy is not higher than the first threshold for restoration determination, the process returns to step S104. When it is determined that the holding energy is higher than the first threshold for restoration determination, the process advances to step S106.

In step S106, the motor control unit for drive 13 ends the additional standby period, and the process further returns to step S101, in which it controls the servomotors for drive 3 in accordance with the normal operation pattern.

Figure 6:
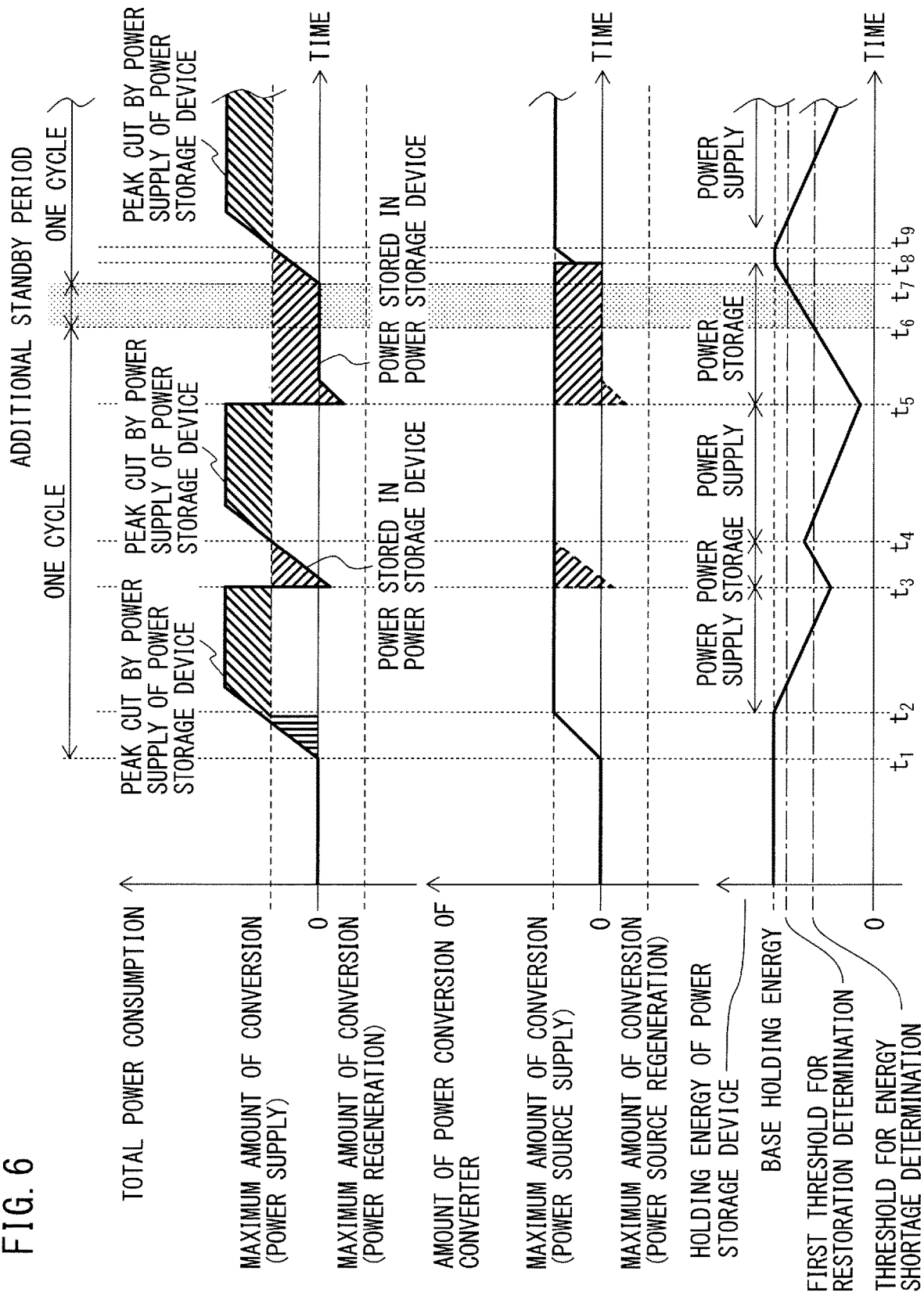
FIG. 6 is a timing chart illustrating an exemplary relationship among the total power consumption, the amount of power conversion of the converter, and the holding energy of the power storage device, when an additional standby period according to a first mode is set and the execution timing of determination processing by a determination unit 16 according to the first mode is implemented, in the motor drive system according to the embodiment.
Figure 7:
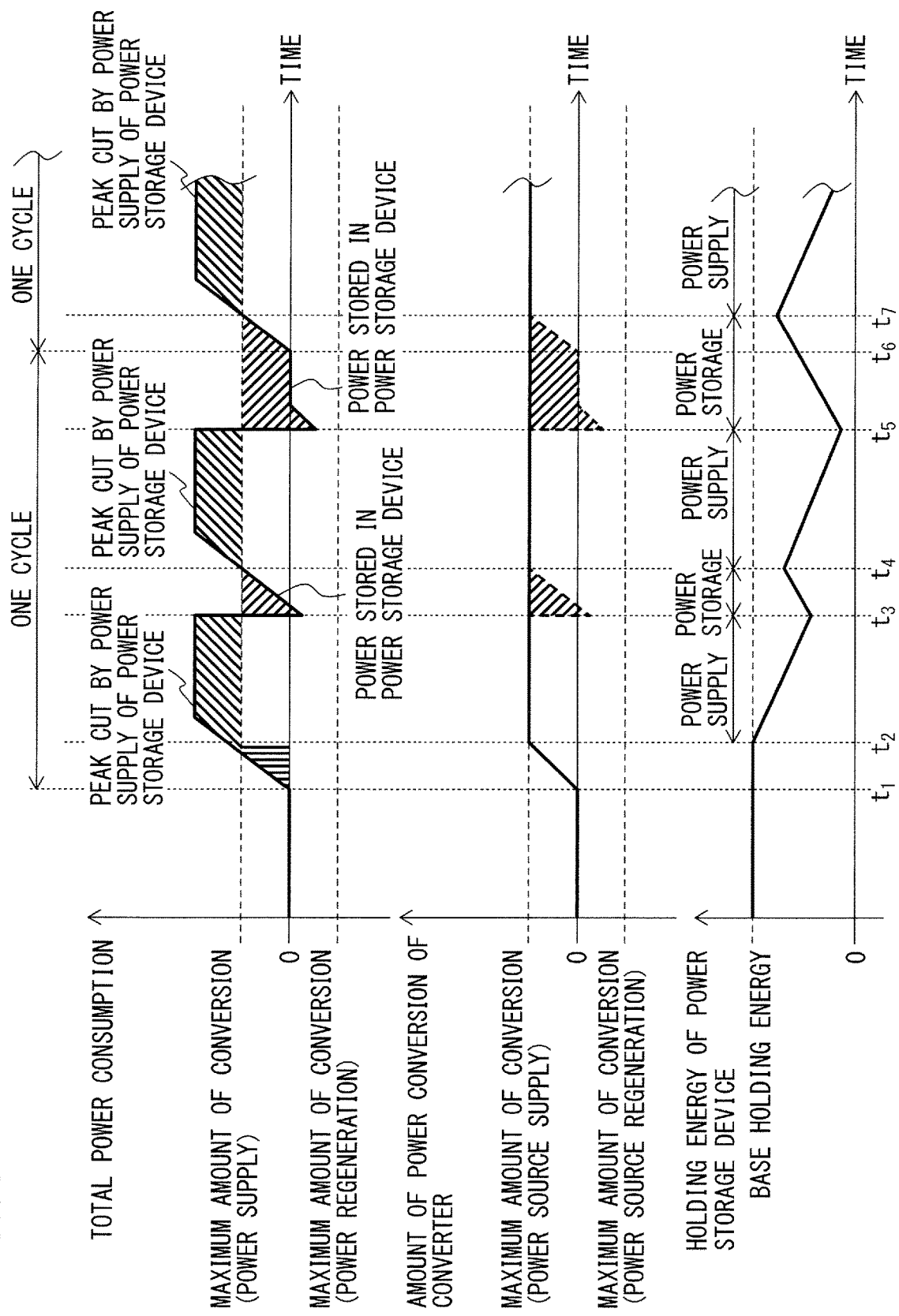
FIG. 7 is a timing chart illustrating an exemplary relationship among the total power consumption, the amount of power conversion of the converter, and the holding energy of the power storage device, when the holding energy of the power storage device runs short after one cycle in the conventional motor drive system.

FIG. 6 is a timing chart illustrating an exemplary relationship among the total power consumption, the amount of power conversion of the converter, and the holding energy of the power storage device, when an additional standby period according to a first mode is set and the execution timing of determination processing by the determination unit 16 according to the first mode is implemented, in the motor drive system according to the embodiment. FIG. 7 is a timing chart illustrating an exemplary relationship among the total power consumption, the amount of power conversion of the converter, and the holding energy of the power storage device, when the holding energy of the power storage device runs short after one cycle in the conventional motor drive system. Referring to FIGS. 6 and 7, the upper section represents the total power consumption calculated by the power consumption calculation unit 21, the middle section represents the amount of power conversion (output) of the converter 11, and the lower section represents the holding energy of the power storage device 14. The case where when the total power consumption changes, as represented in the upper section of FIGS. 6 and 7, the holding energy of the power storage device 14 may run short at time $t_6$ in one cycle of the operation of the servomotors for drive 3 defined from time $t_1$ to time $t_6$ will be considered as an example herein.

Referring to FIGS. 6 and 7, when the total power consumption begins to increase at time $t_1$ and exceeds the maximum amount of conversion (power supply) of the converter 11 at time $t_2$, DC power is supplied from the power storage device 14 to the DC link 4 from time $t_2$ onward, and the power peak of the power source 2 is cut. As a result, the holding energy of the power storage device 14 begins to decrease at time $t_2$.

Referring to FIGS. 6 and 7, when power regeneration is performed upon deceleration of the servomotors for drive 3 at time $t_3$, and the total power consumption then begins to increase again, the power storage device 14 stores DC power fed from the power source 2 to the DC link 4 by the converter 11, and the holding energy of the power storage device 14 gradually rises.

Referring to FIGS. 6 and 7, when the maximum amount of conversion (power supply) of the converter 11 is exceeded at time $t_4$, DC power is supplied from the power storage device 14 to the DC link 4 from time $t_4$ onward, and the power peak of the power source 2 is cut. As a result, the holding energy of the power storage device 14 begins to decrease again at time $t_4$.

Referring to FIGS. 6 and 7, when power regeneration is performed upon deceleration of the servomotors for drive 3 at time $t_5$, and the total power consumption then begins to increase again, the power storage device 14 stores DC power fed from the power source 2 to the DC link 4 by the converter 11, and the holding energy of the power storage device 14 gradually rises. After that, one cycle of the operation of the servomotors for drive 3 is completed at time $t_6$.

As illustrated in FIG. 6, in the motor drive system 1 according to the embodiment, the determination unit 16 performs determination processing at, e.g., time $t_6$. Since FIG. 6 assumes, as an example, that the holding energy of the power storage device may run short at time $t_6$, the determination unit 16 determines at time $t_6$ that the holding energy of the power storage device 14 is lower than the threshold for energy shortage determination. Based on the determination result, the motor control unit for drive 13 sets a start point for the additional standby period after the completion of one certain cycle (time $t_6$) and before the start of another cycle subsequent to the certain cycle. During the additional standby period, since the servomotors for drive 3 are kept standby without operation and therefore consume no power, and the power storage device 14 can store DC power fed from the power source 2 to the DC link 4 by the converter 11, the holding energy of the power storage device 14 gradually rises, as illustrated in FIG. 6. When the holding energy of the power storage device 14 gradually rises and is restored to be higher than the first threshold for restoration determination at time $t_7$ as an example, the motor control unit for drive 13 ends the additional standby period at time $t_7$ and controls the servomotors for drive 3 in accordance with the normal operation pattern from time $t_7$ onward.

As illustrated in FIG. 7, in the conventional motor drive system, since the operation of the servomotors for drive in the next cycle is started while the holding energy of the power storage device remains insufficient at time $t_6$, the servomotors for drive may not continue to be driven due to power shortage.

Figure 8:
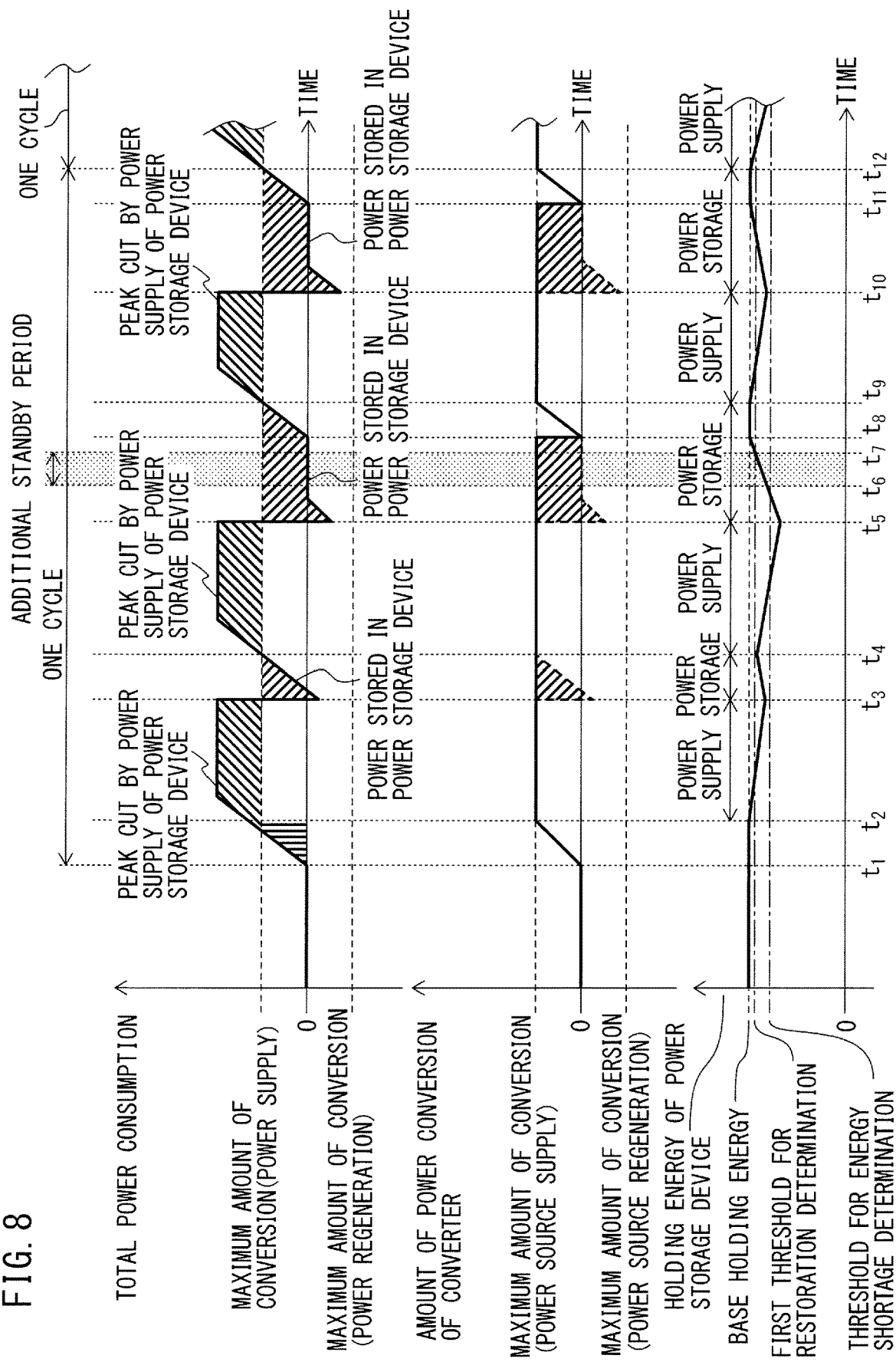
FIG. 8 is a timing chart illustrating an exemplary relationship among the total power consumption, the amount of power conversion of the converter, and the holding energy of the power storage device, when an additional standby period according to a second mode is set and the execution timing of determination processing by the determination unit 16 according to the second mode is implemented, in the motor drive system according to the embodiment.
Figure 9:
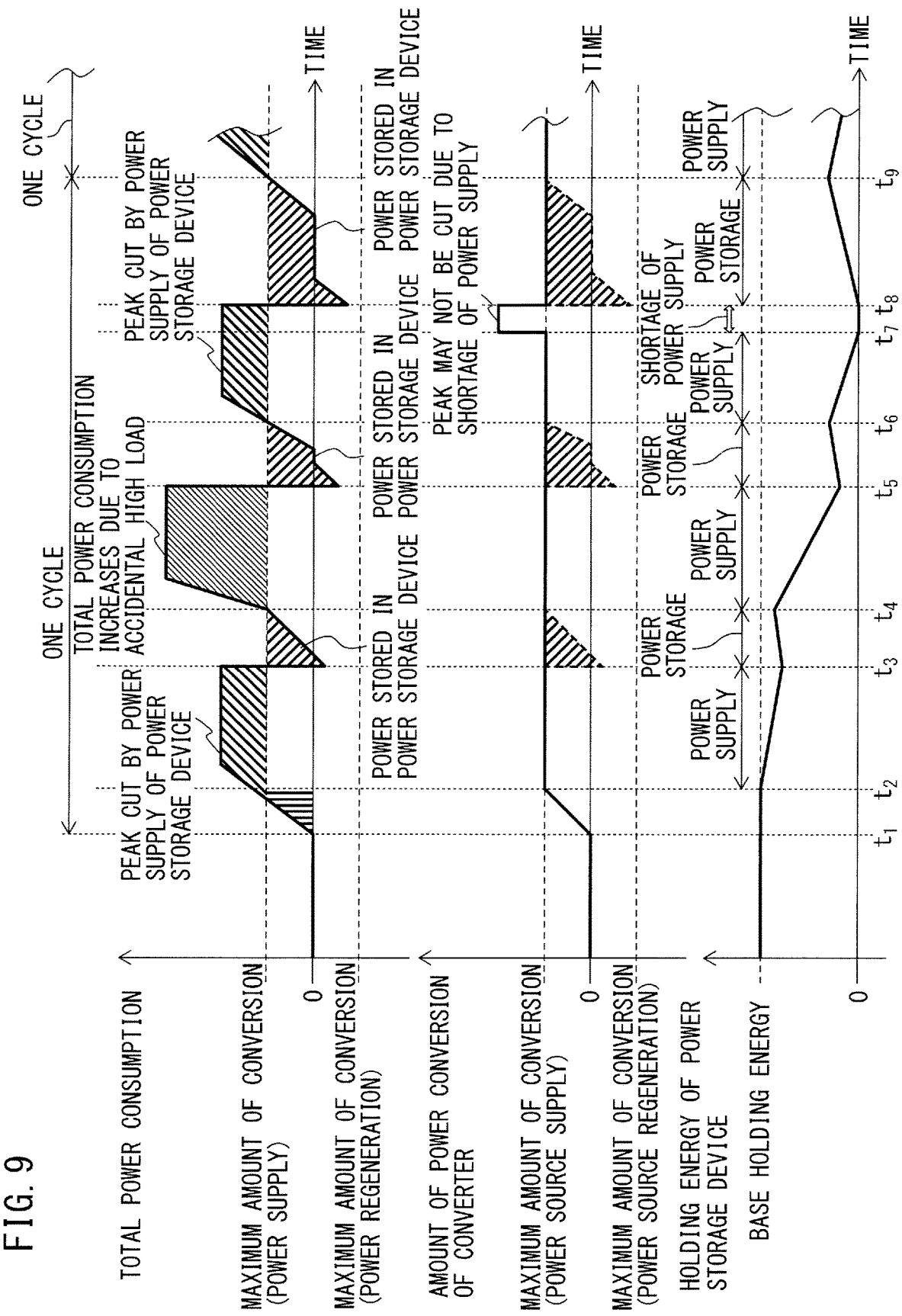
FIG. 9 is a timing chart illustrating an exemplary relationship among the total power consumption, the amount of power conversion of the converter, and the holding energy of the power storage device, when the holding energy of the power storage device runs short within one cycle in the conventional motor drive system.

FIG. 8 is a timing chart illustrating an exemplary relationship among the total power consumption, the amount of power conversion of the converter, and the holding energy of the power storage device, when an additional standby period according to a second mode is set and the execution timing of determination processing by the determination unit 16 according to the second mode is implemented, in the motor drive system according to the embodiment. FIG. 9 is a timing chart illustrating an exemplary relationship among the total power consumption, the amount of power conversion of the converter, and the holding energy of the power storage device, when the holding energy of the power storage device runs short within one cycle in the conventional motor drive system. Referring to FIGS. 8 and 9, the upper section represents the total power consumption calculated by the power consumption calculation unit 21, the middle section represents the amount of power conversion (output) of the converter 11, and the lower section represents the holding energy of the power storage device 14. The case where when the total power consumption changes, as represented in the upper section of FIGS. 8 and 9, the holding energy of the power storage device may run short at time $t_6$ in one cycle will be considered as an example herein. FIG. 8 represents one cycle of the operation of the servomotors for drive 3 defined from time $t_1$ to time $t_{11}$, and FIG. 9 represents one cycle of the operation of the servomotors for drive 3 defined from time $t_1$ to time $t_9$.

Referring to FIGS. 8 and 9, when the total power consumption begins to increase at time $t_1$ and exceeds the maximum amount of conversion (power supply) of the converter 11 at time $t_2$, DC power is supplied from the power storage device 14 to the DC link 4 from time $t_2$ onward, and the power peak of the power source 2 is cut. As a result, the holding energy of the power storage device 14 begins to decrease at time $t_2$.

Referring to FIGS. 8 and 9, when power regeneration is performed upon deceleration of the servomotors for drive 3 at time $t_3$, and the total power consumption then begins to increase again, the power storage device 14 stores DC power fed from the power source 2 to the DC link 4 by the converter 11, and the holding energy of the power storage device 14 gradually rises.

Referring to FIGS. 8 and 9, when the maximum amount of conversion (power supply) of the converter 11 is exceeded at time $t_4$, DC power is supplied from the power storage device 14 to the DC link 4 from time $t_4$ onward, and the power peak of the power source 2 is cut. As a result, the holding energy of the power storage device 14 begins to decrease again at time $t_4$.

Referring to FIGS. 8 and 9, when power regeneration is performed upon deceleration of the servomotors for drive 3 at time $t_5$, and the total power consumption then begins to increase again, the power storage device 14 stores DC power fed from the power source 2 to the DC link 4 by the converter 11, and the holding energy of the power storage device 14 gradually rises. When the servomotors for drive 3 are made at rest in accordance with an operation pattern defined in advance at time $t_6$, the determination unit 16 performs determination processing at time $t_6$ in the motor drive system 1 according to the embodiment, as illustrated in FIG. 8. Since FIG. 8 assumes, as an example, that the holding energy of the power storage device may run short at time $t_6$, the determination unit 16 determines that the holding energy of the power storage device 14 is lower than the threshold for energy shortage determination. Based on the determination result, the motor control unit for drive 13 sets a start point for the additional standby period at time $t_6$ in one cycle. During the additional standby period, since the servomotors for drive 3 are kept standby without operation and therefore consume no power, and the power storage device 14 can store DC power fed from the power source 2 to the DC link 4 by the converter 11, the holding energy of the power storage device 14 gradually rises, as illustrated in FIG. 8. When the holding energy of the power storage device 14 gradually rises and is restored to be higher than the first threshold for restoration determination at time $t_7$ as an example, the motor control unit for drive 13 ends the additional standby period and controls the servomotors for drive 3 in accordance with the normal operation pattern from time $t_7$ onward.

As illustrated in FIG. 9, in the conventional motor drive system, since the operation of the servomotors for drive in the next cycle is started while the holding energy of the power storage device remains insufficient at time $t_6$, the servomotors for drive may not continue to be driven due to power shortage.

Another embodiment for preventing storage of excess holding energy in a power storage device 14 will be described next.

In the embodiment described with reference to FIGS. 1 to 9, when it is determined that the holding energy of the power storage device 14 is lower than the threshold for energy shortage determination, an additional standby period in which the servomotors for drive 3 are inactive is set at a certain point of time in a predetermined operation pattern, and the holding energy of the power storage device 14 is restored to at least a first threshold for restoration determination during the additional standby period to prevent an alarm stop of the motor drive system 1 due to shortage of DC power stored in the power storage device 14. In the other embodiment to be described hereinafter, especially when the power storage device 14 is of the flywheel type, storage of excess holding energy is prevented, in addition to a measure against shortage of holding energy of the power storage device 14.

The configuration of a motor drive system 1 according to the other embodiment is the same as described above with reference to FIG. 2, i.e., the power storage device 14 includes a flywheel 41, a servomotor for buffer 42, and an inverter for buffer 43.

Even in this embodiment, when the determination unit 16 determines that the holding energy stored in the power storage device 14 is lower than a threshold for energy shortage determination defined in advance, it controls the servomotors for drive 3 by setting an additional standby period in which the servomotors for drive 3 are inactive at a certain point of time in a predetermined operation pattern. During the additional standby period set upon determination by the determination unit 16 that the holding energy is lower than the threshold for energy shortage determination, the determination unit 16 determines whether the holding energy of the power storage device 14 is higher than the first threshold for restoration determination.

In this embodiment, the determination unit 16 further determines whether the holding energy stored in the power storage device 14 is higher than a threshold for excess energy determination defined in advance. The threshold for excess energy determination is set to determine whether an additional standby period for releasing excess holding energy stored in the flywheel power storage device 14 to the DC link 4 is to be set. The determination unit 16 even determines whether the holding energy of the power storage device 14 is lower than a second threshold for restoration determination defined in advance. In other words, the threshold for excess energy determination is used for determination processing as to whether an additional standby period for releasing excess holding energy stored in the flywheel power storage device 14 to the DC link 4 is to be set. The second threshold for restoration determination is used by the determination unit 16 for determination processing as to whether the additional standby period set upon determination that the holding energy is higher than the threshold for excess energy determination is to be ended. When the appropriate amount of holding energy of the power storage device 14 is defined as a "base holding energy," the base holding energy, the threshold for excess energy determination, and the second threshold for restoration determination satisfy the following relation:

Threshold for Excess Energy Determination≥Second Threshold for Restoration Determination>Base Holding Energy (4)

As presented in relation (4), the second threshold for restoration determination is set to a value equal to or smaller than the threshold for energy shortage determination.

When the holding energy of the power storage device 14 is calculated as an amount of power based on equation (1) or (2) by the holding energy calculation unit 15, a threshold for excess energy determination and a second threshold for restoration determination having the same unit as that of the amount of power are set. When the holding energy calculation unit 15 is omitted and the holding energy of the power storage device 14 is represented by the rotation speed (or its square) of the servomotor for buffer 42, a threshold for excess energy determination and a second threshold for restoration determination having the same unit as that of the rotation speed (or its square) are set.

When the determination unit 16 determines that the holding energy is higher than the threshold for excess energy determination, the motor control unit for drive 13 controls the servomotors for drive 3 by setting an additional standby period at a certain point of time in a predetermined operation pattern. During the additional standby period, excess holding energy stored in the flywheel power storage device 14 is released to the DC link 4. The threshold for excess energy determination is set to a value which, for example, inhibits the rotation speed of the servomotor for buffer 42 in the power storage device 14 from exceeding an upper limit speed and, for example, inhibits the amount of power conversion of the inverter for buffer 43 in the power storage device 14 from exceeding a maximum amount of conversion, to prevent storage of excess holding energy in the power storage device 14. Therefore, the threshold for excess energy determination is larger than the threshold for energy shortage determination.

During the additional standby period set upon determination by the determination unit 16 that the holding energy is higher than the threshold for excess energy determination, the determination unit 16 determines whether the holding energy of the power storage device 14 is lower than the second threshold for restoration determination. The holding energy of the power storage device 14 is gradually released during the additional standby period set upon determination by the determination unit 16 that the holding energy is higher than the threshold for excess energy determination, and when the determination unit 16 determines that the holding energy of the power storage device 14 is lower than the second threshold for restoration determination, it ends the additional standby period, and the motor control unit for drive 13 controls the servomotors for drive 3 in accordance with the normal operation pattern. In other words, an end point for the additional standby period set upon determination by the determination unit 16 that the holding energy is higher than the threshold for excess energy determination is set after the determination unit 16 further determines that the holding energy is lower than the second threshold for restoration determination after determining that the holding energy is higher than the threshold for excess energy determination. This means that an additional standby period for releasing excess holding energy stored in the flywheel power storage device 14 to the DC link 4 continues until the determination unit 16 determines that the holding energy is lower than the second threshold for restoration determination after determining that the holding energy is higher than the threshold for excess energy determination.

To minimize the adverse effect that an additional stop of the servomotors for drive 3 exerts on the machine equipped with the servomotors for drive 3, a start point for the additional standby period set upon determination by the determination unit 16 that the holding energy is higher than the threshold for excess energy determination is set between one certain cycle and another cycle subsequent to the certain cycle or set at a certain point of time in one certain cycle, in a predetermined operation pattern in which an operation for each cycle is defined. Even the execution timing of determination processing using the threshold for excess energy determination by the determination unit 16 is set between one certain cycle and another cycle subsequent to the certain cycle or set at a certain point of time in one certain cycle, in a predetermined operation pattern in which an operation for each cycle is defined, like the threshold for energy shortage determination. Determination processing as to whether the additional standby period is to be ended using the second threshold for restoration determination is always performed by the determination unit 16 during the additional standby period.

Figure 10:
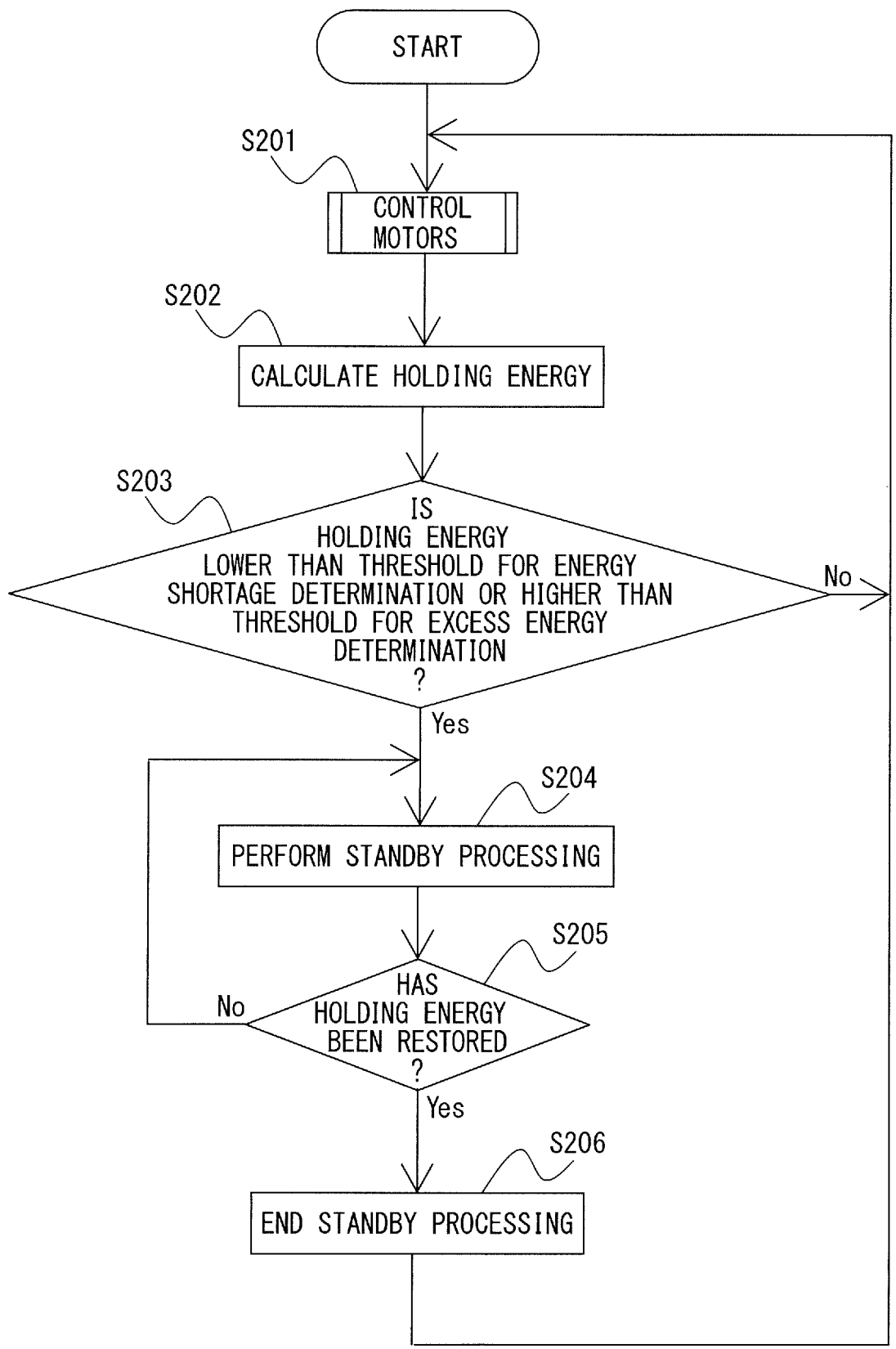
FIG. 10 is a flowchart illustrating the operation sequence of a motor drive system according to another embodiment.

FIG. 10 is a flowchart illustrating the operation sequence of a motor drive system according to the other embodiment.

The motor control unit for drive 13 controls the servomotors for drive 3 to operate them in accordance with a predetermined operation pattern (step S201). During this control, the power storage device control unit 23 controls power storage and power supply of the power storage device 14, using the calculation results obtained by the power consumption calculation unit 21 and the stored power and supplied power calculation unit 22.

In step S202, the holding energy calculation unit 15 calculates the holding energy of the power storage device 14.

In step S203, the determination unit 16 determines whether the holding energy of the power storage device 14 is lower than a threshold for energy shortage determination defined in advance, and whether the holding energy of the power storage device 14 is higher than a threshold for excess energy determination defined in advance. When it is determined that the holding energy is not lower than the threshold for energy shortage determination and is not higher than the threshold for excess energy determination, the process returns to step S201. When it is determined that the holding energy is lower than the threshold for energy shortage determination or when it is determined that the holding energy is higher than the threshold for excess energy determination, the process advances to step S204.

In step S204, the motor control unit for drive 13 sets an additional standby period in which the servomotors for drive 3 are inactive at a certain point of time in the predetermined operation pattern (standby processing).

During the additional standby period set upon determination by the determination unit 16 in step S203 that the holding energy is lower than the threshold for energy shortage determination, since the servomotors for drive 3 are kept standby without operation and therefore consume no power, and the power storage device 14 stores DC power fed from the power source 2 to the DC link 4 by the converter 11, the holding energy of the power storage device 14 gradually rises.

During the additional standby period set upon determination by the determination unit 16 in step S203 that the holding energy is higher than the threshold for excess energy determination, the servomotors for drive 3 are inactive, and the power storage device control unit 23 controls the power conversion operation of the inverter for buffer 43 in the power storage device 14 by outputting a power supply command to the inverter for buffer 43, to release excess holding energy stored in the flywheel power storage device 14 to the DC link 4. The inverter for buffer 43 performs a rectification operation for converting AC regenerative power into DC power by generating the AC regenerative power upon decelerating the servomotor for buffer 42 connected to the flywheel 41, based on a power supply command received from the power storage device control unit 23. Hence, rotation energy stored in the flywheel 41 is converted into electrical energy and released to the DC link 4. During this operation, the released electrical energy is stored in a DC link capacitor (not illustrated) so that the voltage of the DC link capacitor gradually rises, but to prevent the occurrence of excess voltage on the DC link capacitor, the converter 11 performs control to convert the DC power in the DC link 4 into AC power and output the AC power to the power source 2, so as not to exceed a maximum amount of power conversion.

In step S205, the determination unit 16 determines whether the holding energy of the power storage device 14 has been restored to the base holding energy. More specifically, when the determination unit 16 determines in step S203 that the holding energy is lower than the threshold for energy shortage determination, it determines in step S205 whether the holding energy is higher than the first threshold for restoration determination; or when the determination unit 16 determines in step S203 that the holding energy is higher than the threshold for excess energy determination, it determines in step S205 whether the holding energy is lower than the second threshold for restoration determination. When it is determined that the holding energy has not been restored, the process returns to step S204. When it is determined that the holding energy has been restored, the process advances to step S206.

In step S206, the motor control unit for drive 13 ends the additional standby period, and the process further returns to step S201, in which the motor control unit for drive 13 controls the servomotors for drive 3 in accordance with the normal operation pattern.

Figure 11:
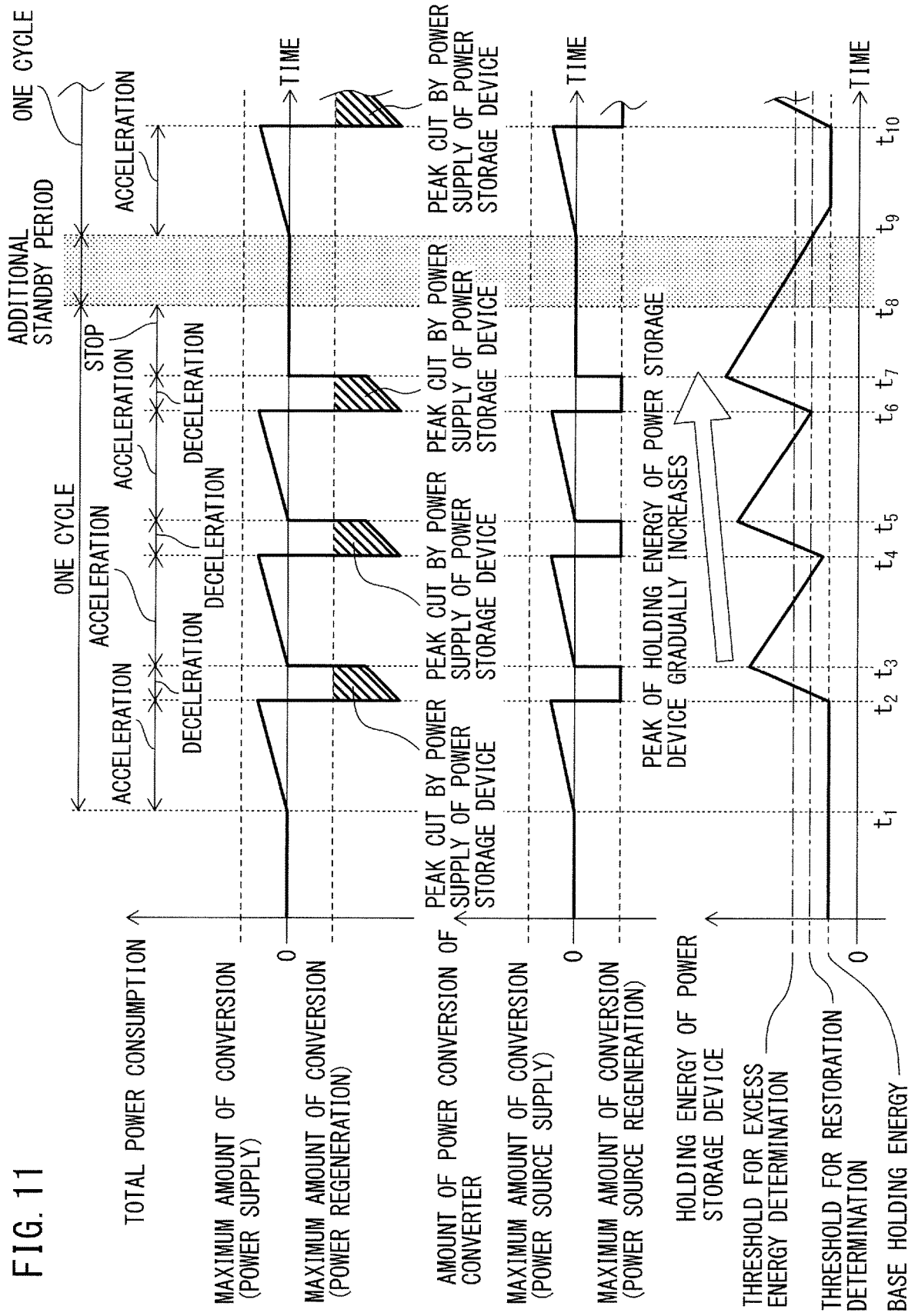
FIG. 11 is a timing chart illustrating an exemplary relationship among the total power consumption, the amount of power conversion of a converter, and the holding energy of a power storage device, when an additional standby period for releasing excess holding energy of the power storage device is set, in the motor drive system according to the other embodiment.

FIG. 11 is a timing chart illustrating an exemplary relationship among the total power consumption, the amount of power conversion of a converter, and the holding energy of a power storage device, when an additional standby period for releasing excess holding energy of the power storage device is set, in the motor drive system according to the other embodiment. FIG. 12 is a timing chart illustrating an exemplary relationship among the total power consumption, the amount of power conversion of the converter, and the holding energy of the power storage device, when excess holding energy is stored in the power storage device within one cycle in the conventional motor drive system. Referring to FIGS. 11 and 12, the upper section represents the total power consumption calculated by the power consumption calculation unit 21, the middle section represents the amount of power conversion (output) of the converter 11, and the lower section represents the holding energy of the flywheel power storage device 14. The case where in one cycle defined, for example, from time $t_1$ to time $t_8$, when the total power consumption changes upon acceleration, deceleration, acceleration, deceleration, acceleration, deceleration, and a stop performed by the servomotors for drive 3 in accordance with an operation pattern defined in advance, excess holding energy is stored in the power storage device 14 at time $t_8$ in this cycle will be considered as an example herein. FIGS. 11 and 12 illustrate an exemplary operation in which the power consumption is low upon acceleration of the servomotors for drive 3 and the regenerative power is high upon their deceleration as an example. An operation for accelerating the servomotors for drive 3 at a large time constant and a low torque upon their acceleration and abruptly decelerating them at a small time constant and a high torque upon their deceleration, for example, corresponds to the above-mentioned operation. When the power consumption is low upon acceleration of the servomotors for drive 3 and the regenerative power is high upon their deceleration, the peak of the holding energy of the flywheel power storage device 14 gradually increases in one cycle, as illustrated in FIGS. 11 and 12.

Referring to FIGS. 11 and 12, when the servomotors for drive 3 accelerate at time $t_1$, the total power consumption begins to increase. Power regeneration is performed upon deceleration of the servomotors for drive 3 at time $t_2$, and when the maximum amount of conversion (power regeneration) of the converter 11 is exceeded, DC power from the DC link 4 is stored in the power storage device 14, and the power peak of the power source 2 is cut. As a result, the holding energy of the power storage device 14 begins to rise at time $t_2$. When the total power consumption begins to increase upon acceleration of the servomotors for drive 3 at time $t_3$, DC power is supplied from the power storage device 14 to the DC link 4, and the holding energy of the power storage device 14 gradually lowers. Power regeneration is performed upon deceleration of the servomotors for drive 3 at time $t_4$, and when the maximum amount of conversion (power regeneration) of the converter 11 is exceeded, DC power from the DC link 4 is stored in the power storage device 14, and the power peak of the power source 2 is cut. As a result, the holding energy of the power storage device 14 begins to rise at time $t_4$. When the total power consumption begins to increase upon acceleration of the servomotors for drive 3 at time $t_5$, DC power is supplied from the power storage device 14 to the DC link 4, and the holding energy of the power storage device 14 gradually lowers. Power regeneration is performed upon deceleration of the servomotors for drive 3 at time $t_6$, and when the maximum amount of conversion (power regeneration) of the converter 11 is exceeded, DC power from the DC link 4 is stored in the power storage device 14, and the power peak of the power source 2 is cut. The servomotors for drive 3 are at rest in the period from time $t_7$ to time $t_8$.

When the servomotors for drive 3 are made at rest in accordance with an operation pattern defined in advance at time $t_8$, the determination unit 16 performs determination processing at time $t_8$ in the motor drive system 1 according to the embodiment, as illustrated in FIG. 11. Since FIG. 11 assumes, as an example, that excess holding energy is stored in the power storage device at time $t_8$, the determination unit 16 determines that the holding energy of the power storage device 14 is higher than the threshold for excess energy determination. Based on the determination result, the motor control unit for drive 13 sets a start point for the additional standby period at time $t_8$ after the completion of one cycle. During the additional standby period, the servomotors for drive 3 are inactive, and the power storage device control unit 23 controls the power conversion operation of the inverter for buffer 43 in the power storage device 14 by outputting a power supply command to the inverter for buffer 43, to release excess holding energy stored in the flywheel power storage device 14 to the DC link 4. The inverter for buffer 43 performs a rectification operation for converting AC regenerative power into DC power by generating the AC regenerative power upon decelerating the servomotor for buffer 42 connected to the flywheel 41, based on a power supply command received from the power storage device control unit 23. Hence, rotation energy stored in the flywheel 41 is converted into electrical energy and released to the DC link 4. During this operation, the released electrical energy is stored in a DC link capacitor (not illustrated) so that the voltage of the DC link capacitor gradually rises, but to prevent the occurrence of excess voltage on the DC link capacitor, the converter 11 performs control to convert the DC power in the DC link 4 into AC power and output the AC power to the power source 2, so as not to exceed a maximum amount of power conversion. Hence, the holding energy of the power storage device 14 gradually lowers, as illustrated in FIG. 11. When the holding energy of the power storage device 14 gradually lowers and is restored to be lower than the second threshold for restoration determination at time $t_9$ as an example, the motor control unit for drive 13 ends the additional standby period and controls the servomotors for drive 3 for the next cycle in accordance with the normal operation pattern from time $t_9$ onward. FIG. 11 illustrates an exemplary operation in which the peak (times $t_3$, $t_5$, and $t_7$) of the holding energy of the flywheel power storage device 14 gradually increases in one cycle, but in the motor drive system according to the other embodiment, since the holding energy of the power storage device 14 does not exceed a maximum energy allowance permitted for the power storage device 14 in the next cycle, the servomotors for drive can continue to be driven in this cycle.

As illustrated in FIG. 11, in the conventional motor drive system, since the operation of the servomotors for drive in the next cycle is started while excess holding energy remains stored in the power storage device, the servomotors for drive may not continue to be driven.

The above-mentioned motor control unit for drive 13, holding energy calculation unit 15, determination unit 16, power consumption calculation unit 21, stored power and supplied power calculation unit 22, and power storage device control unit 23 may be constructed in, e.g., software program form, or constructed as a combination of various electronic circuits and a software program. In this case, the function of each unit can be implemented by causing an arithmetic processing unit in, e.g., a computer to operate the software program. Alternatively, the function of each unit may be implemented as a semiconductor integrated circuit in which a software program for implementing the functions of the motor control unit for drive 13, the holding energy calculation unit 15, the determination unit 16, the power consumption calculation unit 21, the stored power and supplied power calculation unit 22, and the power storage device control unit 23 is written.

The motor control unit for drive 13, the holding energy calculation unit 15, the determination unit 16, the power consumption calculation unit 21, the stored power and supplied power calculation unit 22, and the power storage device control unit 23 are provided in, e.g., a main controller (not illustrated) of the motor drive system 1. When, for example, the motor drive system 1 is used to control driving of the servomotors for drive 3 provided in a machine tool, the motor control unit for drive 13, the holding energy calculation unit 15, the determination unit 16, the power consumption calculation unit 21, the stored power and supplied power calculation unit 22, and the power storage device control unit 23 may be provided in a numerical controller for the machine tool. When the motor control unit for drive 13, the holding energy calculation unit 15, the determination unit 16, the power consumption calculation unit 21, the stored power and supplied power calculation unit 22, and the power storage device control unit 23 are constructed in software program form, the function of each unit can be implemented by causing an arithmetic processing unit in the numerical controller to operate the software program.

According to one aspect of the present disclosure, in a motor drive system including a power storage device provided to reduce the power peak of an AC power source, the machine operating ratio can be improved by suppressing an alarm stop of the motor drive system due to shortage of DC power stored in the power storage device.

The invention claimed is:

1. A motor drive system comprising:
a converter configured to convert power between AC power in a power source and DC power in a DC link;
an inverter for drive configured to convert power between the DC power in the DC link and AC power serving as one of drive power and regenerative power for a servomotor for drive;
a motor control unit for drive configured to control the servomotor for drive connected to the inverter for drive to operate the servomotor for drive in accordance with a predetermined operation pattern including a plurality of cycles where the servomotor is driven by the motor control unit such that the servomotor is active;
a power storage device configured to store the DC power from the DC link or supplies the DC power to the DC link; and
a determination unit configured to determine whether a holding energy of the power storage device is lower than a threshold for energy shortage determination defined in advance,
wherein when the determination unit determines that the holding energy is lower than the threshold for energy shortage determination, the motor control unit for drive controls the servomotor for drive by setting an additional standby period in between two sequential cycles of the plurality of cycles, during the additional standby period the motor control unit controls the servomotor to stop such that the servomotor is inactive, and
wherein the determination unit determines whether the holding energy of the power storage device is higher than a first threshold for restoration determination defined in advance, and an end point for the additional standby period set upon determination by the determination unit that the holding energy is lower than the threshold for energy shortage determination is set after the determination unit further determines that the holding energy is higher than the first threshold for restoration determination after determining that the holding energy is lower than the threshold for energy shortage determination.

2. The motor drive system according to claim 1, further comprising: a holding energy calculation unit configured to calculate the holding energy of the power storage device.

3. The motor drive system according to claim 1, wherein a start point for the additional standby period is set between the two sequential cycles.

4. The motor drive system according to claim 1, wherein a start point for the additional standby period is set within one of the two sequential cycles.

5. The motor drive system according to claim 1, wherein the first threshold for restoration determination is set to a value of not less than the threshold for energy shortage determination.

6. The motor drive system according to claim 1, wherein the determination unit determines whether the holding energy is lower than the threshold for energy shortage determination, between the two sequential cycles.

7. The motor drive system according to claim 1, wherein the determination unit determines whether the holding energy is lower than the threshold for energy shortage determination, within one of the two sequential cycles.

8. The motor drive system according to claim 1, wherein the determination unit determines whether the holding energy is higher than a threshold for excess energy determination which is defined in advance and larger than the threshold for energy shortage determination, and
when the determination unit determines that the holding energy is higher than the threshold for excess energy determination, the motor control unit for drive controls the servomotor for drive by setting the additional standby period in the predetermined operation pattern.

9. The motor drive system according to claim 8, wherein the determination unit determines whether the holding energy of the power storage device is lower than a second threshold for restoration determination defined in advance, and
an end point for the additional standby period set upon determination by the determination unit that the holding energy is higher than the threshold for excess energy determination is set after the determination unit further determines that the holding energy is lower than the second threshold for restoration determination after determining that the holding energy is higher than the threshold for excess energy determination.

10. The motor drive system according to claim 9, wherein the second threshold for restoration determination is set to a value of not more than the threshold for excess energy determination.

11. The motor drive system according to claim 8, wherein the determination unit determines whether the holding energy is higher than the threshold for excess energy determination, between the two sequential cycles.

12. The motor drive system according to claim 8, wherein the determination unit determines whether the holding energy is higher than the threshold for excess energy determination, at within one of the two sequential cycles.

13. The motor drive system according to claim 1, wherein the power storage device comprises:
   a flywheel configured to store rotation energy;
   a servomotor for buffer comprising a rotation shaft coupled to the flywheel; and
   an inverter for buffer configured to convert power between the DC power in the DC link and the AC power serving as one of the drive power and the regenerative power for the servomotor for buffer.

14. The motor drive system according to claim 1, wherein the power storage device comprises:
   a capacitor; and
   a DC/DC converter configured to convert power between the DC power in the DC link and DC power stored in the capacitor.

* * * * *